United States Patent
Chi et al.

(10) Patent No.: US 10,382,695 B2
(45) Date of Patent: Aug. 13, 2019

(54) MOBILE TERMINAL

(71) Applicant: LG ELECTRONICS INC., Seoul (KR)

(72) Inventors: Jumin Chi, Seoul (KR); Youngwoo Kim, Seoul (KR); Sohoon Yi, Seoul (KR); Shinhae Lee, Seoul (KR); Jaeyoung Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 20 days.

(21) Appl. No.: 15/704,886

(22) Filed: Sep. 14, 2017

(65) Prior Publication Data
US 2018/0249083 A1    Aug. 30, 2018

(30) Foreign Application Priority Data
Feb. 24, 2017 (KR) .................... 10-2017-0025053

(51) Int. Cl.
| | |
|---|---|
| H04N 5/232 | (2006.01) |
| H04M 1/725 | (2006.01) |
| G06F 1/16 | (2006.01) |
| G06F 3/041 | (2006.01) |
| G06F 3/0481 | (2013.01) |
| G06F 3/0482 | (2013.01) |
| G06F 3/0484 | (2013.01) |
| G06F 3/0488 | (2013.01) |

(52) U.S. Cl.
CPC ....... *H04N 5/23293* (2013.01); *G06F 1/1643* (2013.01); *G06F 1/1694* (2013.01); *G06F 3/0412* (2013.01); *G06F 3/0482* (2013.01); *G06F 3/0484* (2013.01); *G06F 3/04817* (2013.01); *G06F 3/04883* (2013.01); *H04M 1/72538* (2013.01); *H04N 5/23216* (2013.01); *H04N 5/23222* (2013.01); *H04M 2250/52* (2013.01)

(58) Field of Classification Search
CPC ...... G06F 3/041; G06F 1/1643; G06F 1/1694; H04N 5/23216; H04N 5/23222; H04N 5/23293; H04M 1/72538
See application file for complete search history.

(56) References Cited

U.S. PATENT DOCUMENTS

| | | | |
|---|---|---|---|
| 2013/0038759 A1* | 2/2013 | Jo ....................... | H04N 5/2256 348/240.99 |
| 2013/0129146 A1* | 5/2013 | Gabay ................ | H04N 5/23222 382/103 |
| 2014/0028823 A1 | 1/2014 | Tahk et al. | |

FOREIGN PATENT DOCUMENTS

EP    2685704 A1    1/2014

* cited by examiner

*Primary Examiner* — Vijay Shankar
*Assistant Examiner* — Cory A Almeida
(74) *Attorney, Agent, or Firm* — Birch, Stewart, Kolasch & Birch, LLP

(57) ABSTRACT

A mobile terminal includes a camera configured to acquire a preview picture including a picture of a subject, a display unit configured to display the preview picture and a controller configured to control the display unit 151 and the camera. The controller displays a guide object configured to provide guidance on taking the picture of the subject, automatically takes the preview picture if a shape of the subject matches a shape of the guide object by a reference value or more, and moves a position of an image of the subject acquired by taking the preview picture to correspond to a position of the guide object and displays a generated final image.

14 Claims, 37 Drawing Sheets

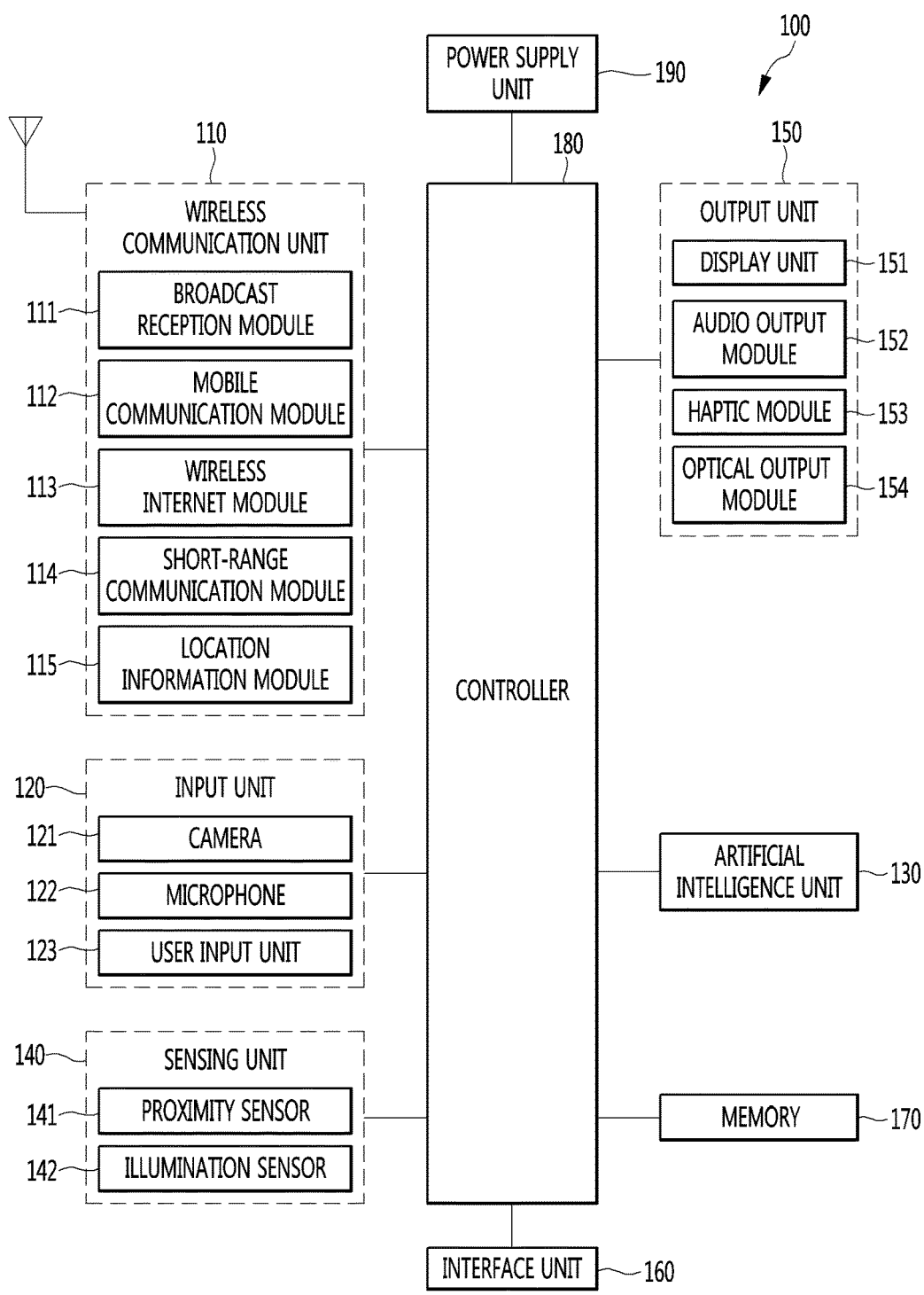

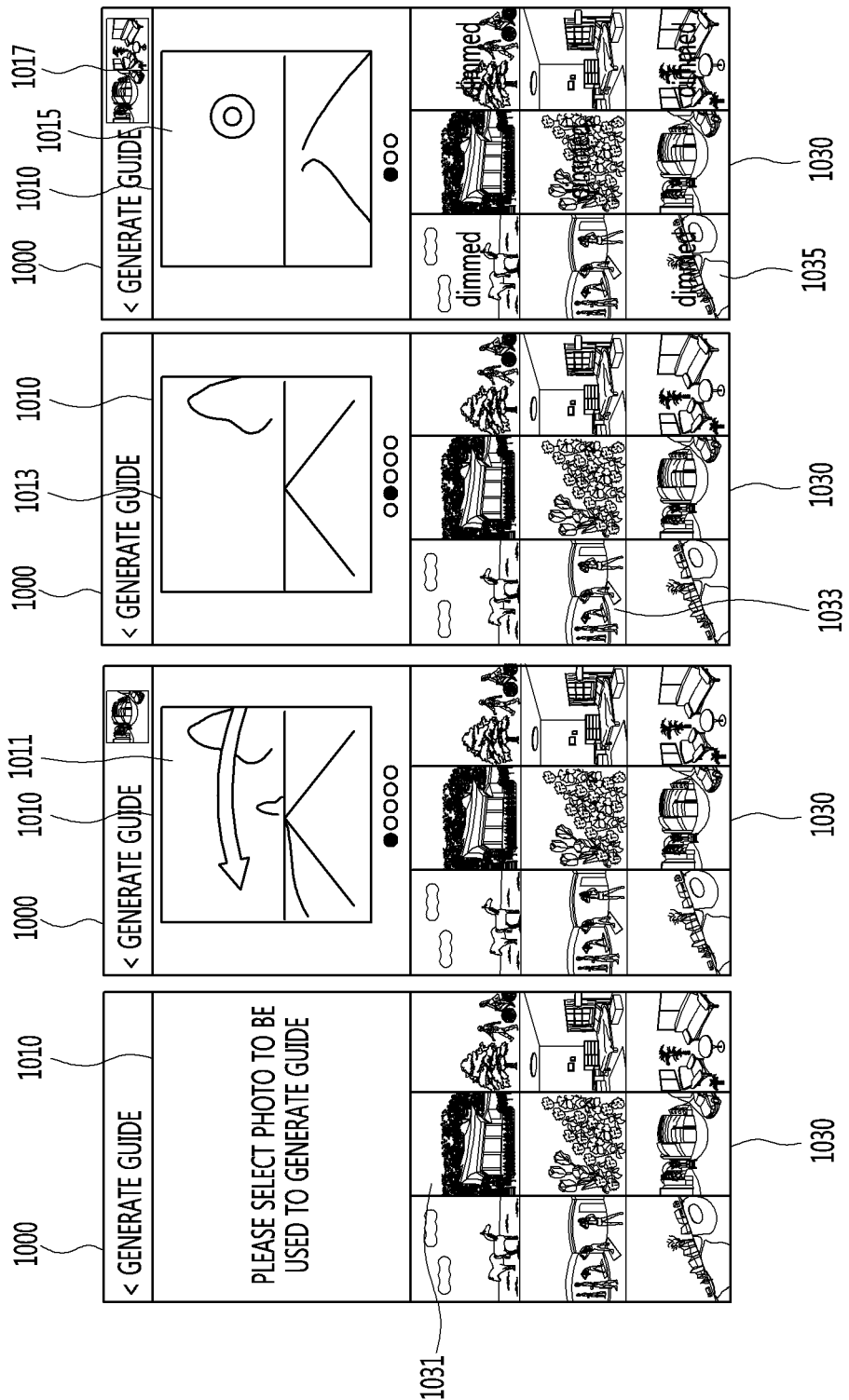

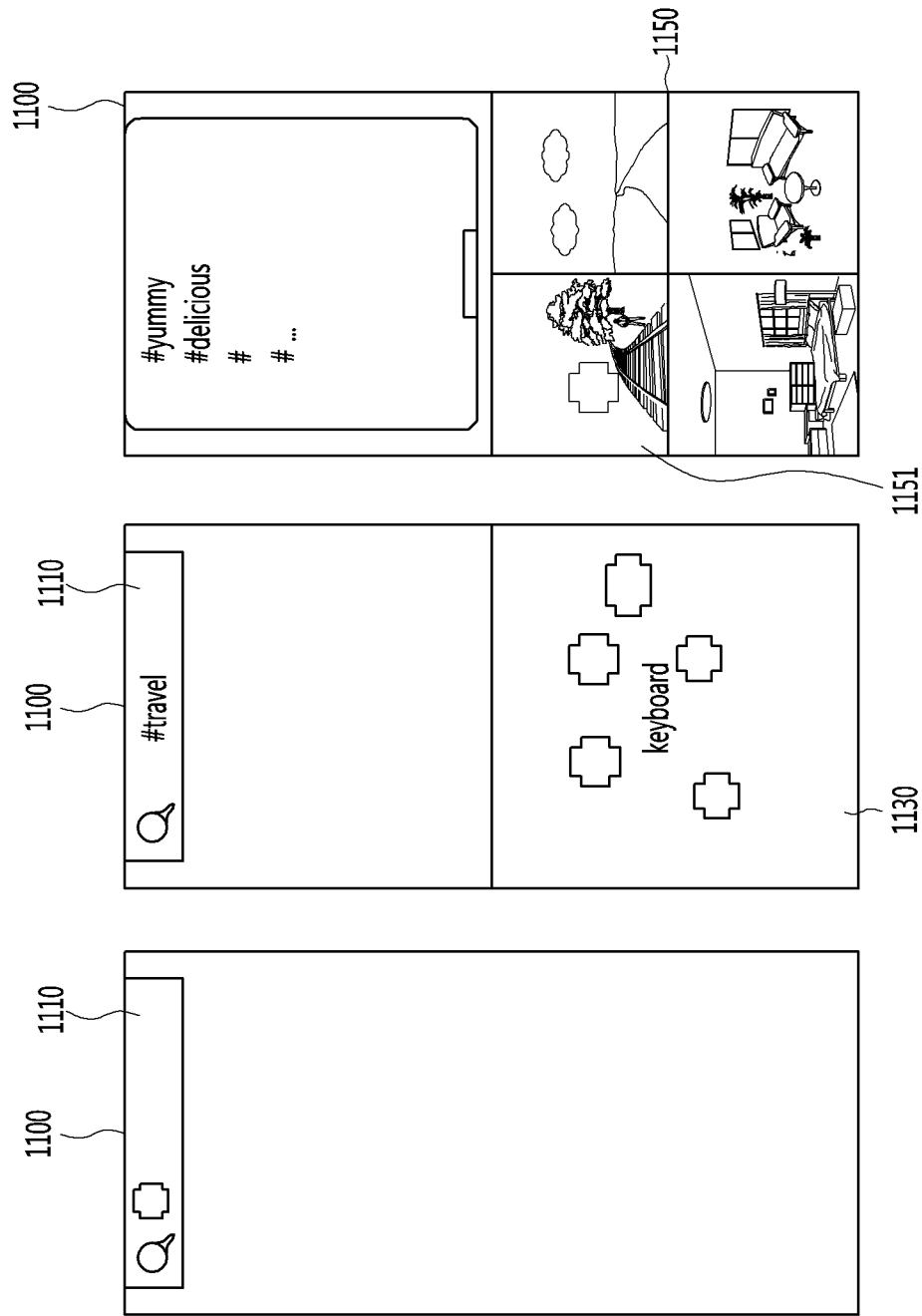

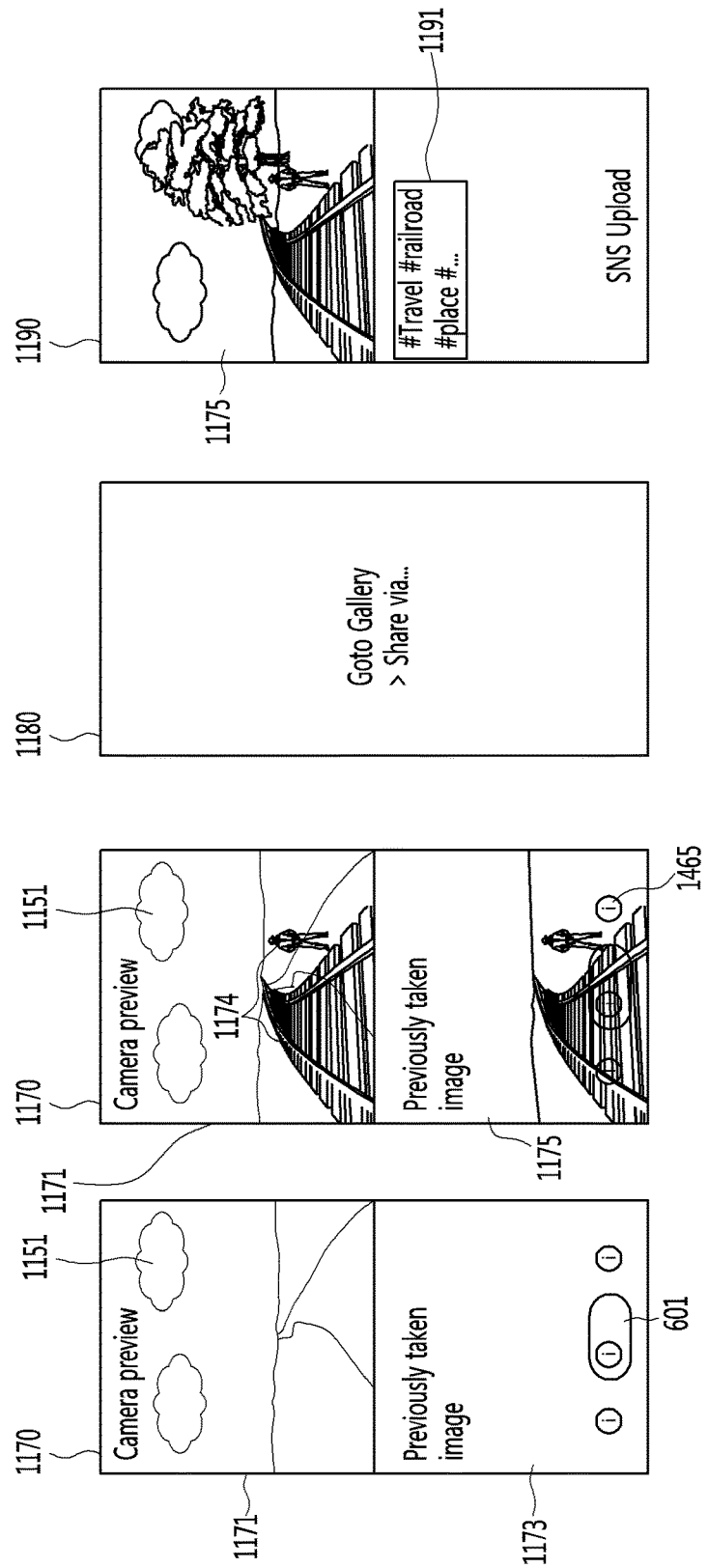

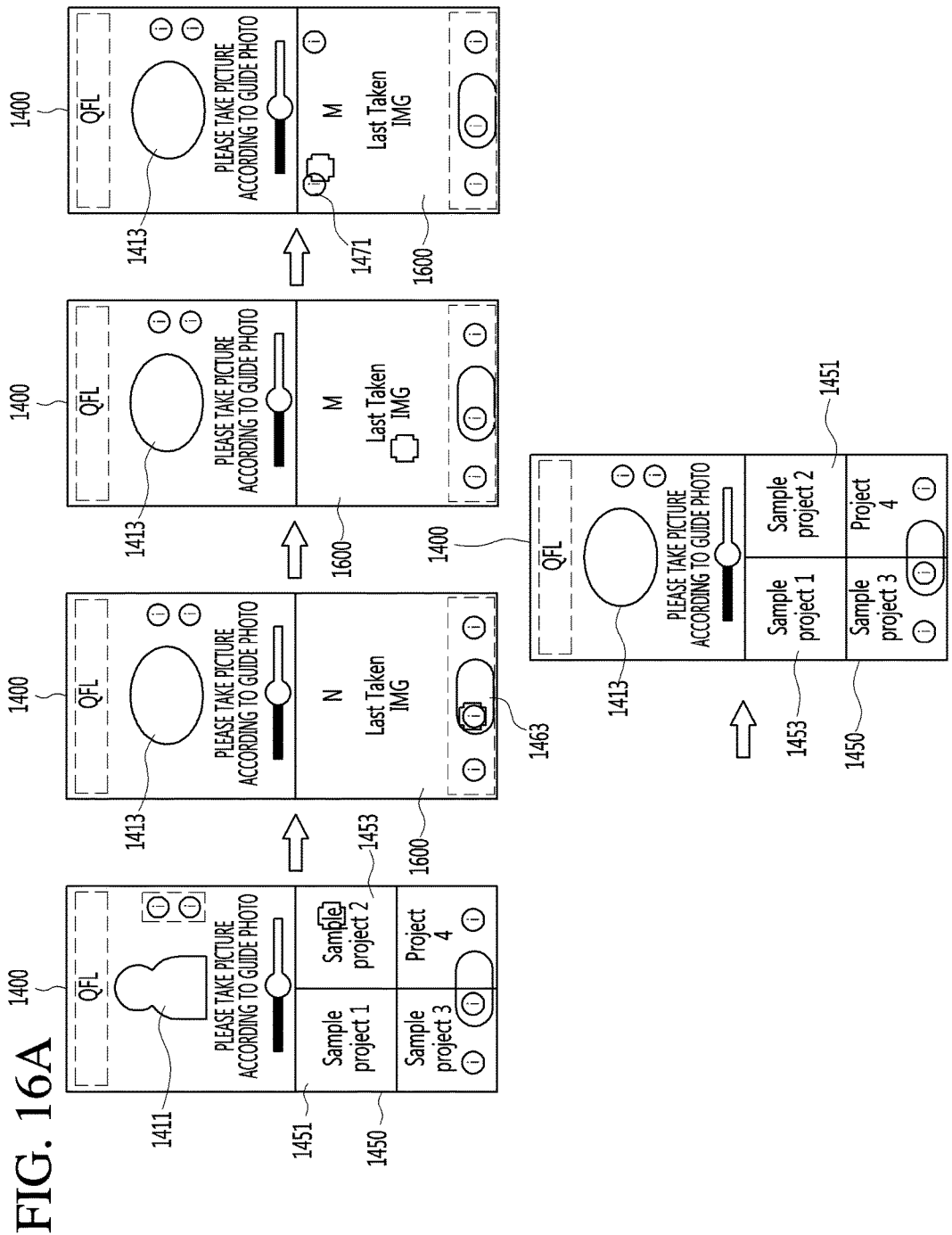

FIG. 27B
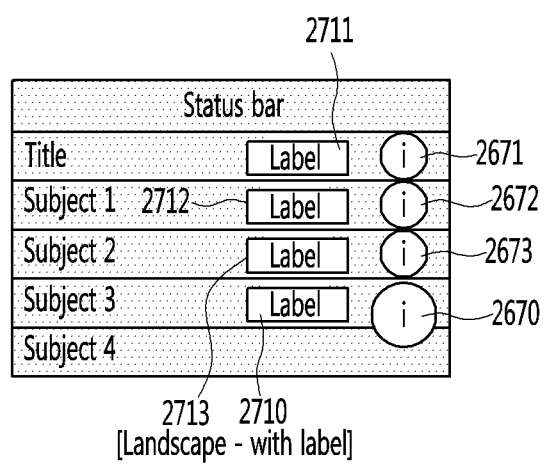
[Landscape - with label]
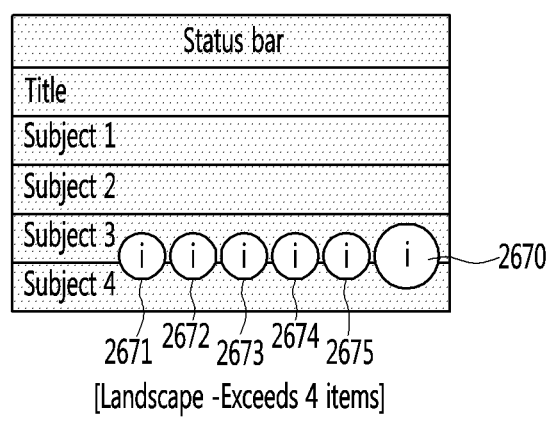
[Landscape -Exceeds 4 items]

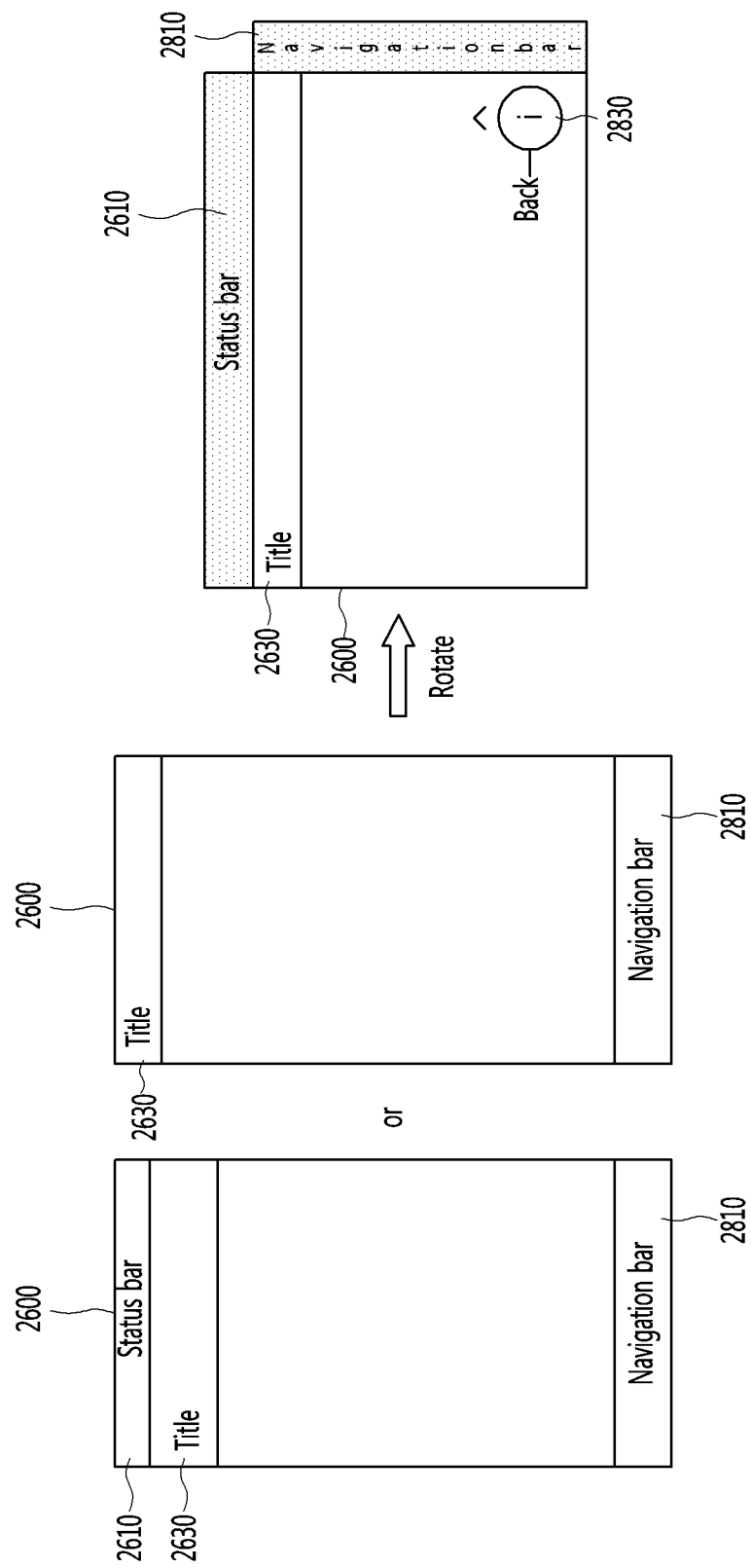

MOBILE TERMINAL

CROSS-REFERENCE TO RELATED APPLICATIONS

This application claims priority under 35 U.S.C. 119 and 365 to Korean Patent Application No. 10-2017-0025053, filed on Feb. 24, 2017 in the Korean Intellectual Property Office, the disclosure of which is incorporated herein by reference.

BACKGROUND

The present invention relates to a mobile terminal and, more particularly, to a mobile terminal for providing a guide upon taking a picture of a subject using a camera.

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

The mobile terminal provides a guide upon taking a picture of a subject using a camera to enable a user to take a picture of the subject according to the guide.

However, in the related art, since a user holds a mobile terminal to take a picture of a subject, the user's hand may shake and thus cannot accurately focus on the subject.

Therefore, the user needs to concentrate on taking the picture of the subject according to a guide.

SUMMARY

Accordingly, an object of the present invention is to address the above-noted and other problems.

An object of the present invention is to provide a mobile terminal capable of automatically taking a preview picture if the shape of a subject included in the preview picture matches that of a guide object by a reference value or more.

Another object of the present invention is to move the position of a whole image corresponding to an automatically taken preview picture such that the position of the image of a subject corresponds to the position of a guide object.

Another object of the present invention is to provide a mobile terminal capable of automatically taking a preview picture if a ratio of the size of a subject included in a preview picture to the size of a guide object is equal to or greater than a reference ratio.

Another object of the present invention is to adjust the size of a whole image corresponding to an automatically taken preview picture such that the position of the image of a subject corresponds to the position of a guide object.

According to an embodiment of the present invention, a mobile terminal includes a camera configured to acquire a preview picture including a picture of a subject, a display unit configured to display the preview picture and a controller configured to control the display unit 151 and the camera. The controller displays a guide object configured to provide guidance on taking the picture of the subject, automatically takes the preview picture if a shape of the subject matches a shape of the guide object by a reference value or more, and moves a position of an image of the subject acquired by taking the preview picture to correspond to a position of the guide object and displays a generated final image.

According to another embodiment, a mobile terminal includes a camera configured to acquire a preview picture including a picture of a subject, a display unit configured to display the preview picture and a controller configured to control the display unit and the camera. The controller displays a guide object configured to provide guidance on taking the picture of the subject, automatically takes the preview picture if a shape of the subject matches a shape of the guide object by a reference value or more and a ratio of a size of the subject to a size of the guide object is equal to or greater than a reference ratio, and adjusts the size of an image of the subject acquired by taking the preview picture to correspond to the size of the guide object and displays a generated final image.

According to the embodiments of the present invention, since a user does not manipulate a display such that a picture of a subject accurately matches a guide object on a preview screen, user convenience can be improved.

According to the embodiments of the present invention, since a picture of a subject matching a guide object can be automatically taken, corrected and provided, a user can easily acquire a desired photo.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

FIG. 1A is a block diagram of a mobile terminal in accordance with the present disclosure.

FIGS. 10a and 10b are diagrams illustrating a method of generating a guide using photos stored through a gallery application according to another embodiment of the present invention.

FIG. 11a is a diagram illustrating an example of generating a guide object using a photo searched for using a social network guide according to an embodiment of the present invention, and FIG. 11b is a diagram illustrating a process of uploading a taken photo to a social network service using a generated guide object.

FIG. 16a is a diagram illustrating a process of performing capturing through a guide overlapping screen according to an embodiment of the present invention.

FIG. 27a is a diagram showing operation according to selection of a floating action button in a state in which a mobile terminal is arranged in a portrait mode and FIG. 27b is a diagram showing operation according to selection of a floating action button in a state in which a mobile terminal is arranged in landscape mode.

FIG. 28 is a diagram illustrating a state in which a floating navigation button is displayed according to an embodiment of the present invention.

DETAILED DESCRIPTION OF THE PREFERRED EMBODIMENT

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
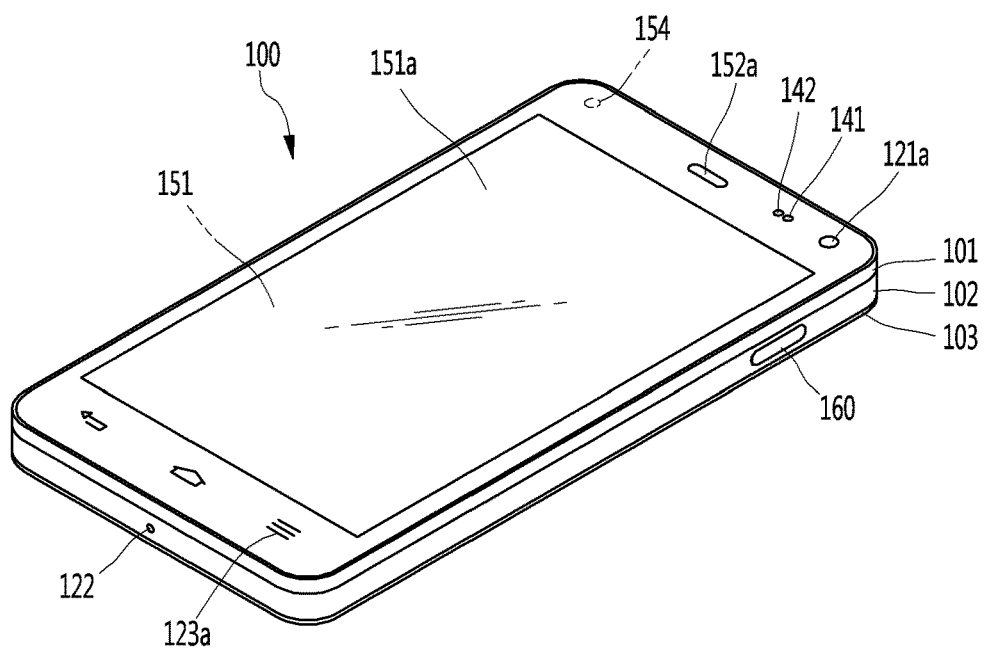
FIGS. 1B and 1C are conceptual views of one example of the mobile terminal, viewed from different directions.
Figure 1C:
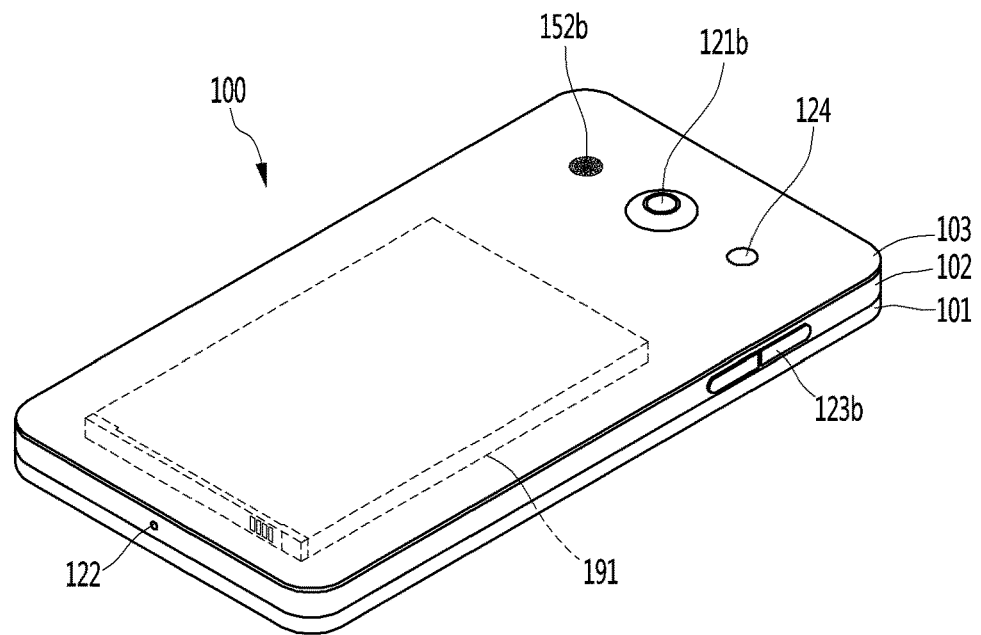

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, an artificial intelligence unit (130), a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The artificial intelligence unit 130 serves to process information based on artificial intelligence technology and may include one or more modules for performing at least one of information learning, information inference, information perception or natural language processing.

The artificial intelligence unit 130 may perform at least one of learning, inference or processing of an enormous amount of information (big data) such as information stored in the mobile terminal, surrounding environmental information of the mobile terminal or information stored in an external storage capable of performing communication using machine learning technology. The artificial intelligence unit 130 may control the mobile terminal to predict (or infer) operation of at least one executable mobile terminal and to perform operation having highest feasibility among one or more predicted operations using information learned using machine learning technology.

Machine learning technology refers to technology for collecting and learning an enormous amount of information based on at least one algorithm and determining and predicting information based on the learned information. Information learning refers to operations for checking features, rules, judgement criteria, etc., of information, quantizing a relation between information and information and predicting new data using the quantized pattern.

An algorithm using such machine learning technology may be based on statistics and may include, for example, a decision tree using a tree structure as a prediction model, a neural network for emulating the neural network structures and functions of living things, genetic programing based on evolutionary algorithms, clustering for dividing observed examples into subsets such as clusters, a Monte Carlo method of stochastically calculating a function value repeated random sampling, etc.

Deep learning technology as machine learning technology refers to technology of performing at least one of information learning, judgement and processing using an artificial neural network. The artificial neural network may have a structure for connecting nodes and delivering data between nodes. Such deep learning technology may learn an enormous amount of information through an artificial neural network using an optimized graphics processing unit (GPU) optimized for parallel arithmetic.

Meanwhile, the artificial intelligence unit 130 may collect (sense, monitor, extract, detect, or receive) signals, data, information, etc. input to or output from components of the mobile terminal, in order to collect an enormous amount of information for applying machine learning technology. In addition, the artificial intelligence unit 130 may collect (sense, monitor, extract, detect or receive) data, information, etc. stored in an external storage (e.g., a cloud server). More specifically, information collection may be understood as including operation for sensing information through a sensor, extracting information stored in the memory 170 or receiving information from the external storage through communication.

The artificial intelligence unit 130 may sense internal information of the mobile terminal, surrounding environmental information of the mobile terminal and user information through the sensing unit 140. In addition, the artificial intelligence unit 130 may receive broadcast signals and/or broadcast related information, wireless signals, wireless data, etc. through the wireless communication unit 110. In addition, the artificial intelligence unit 130 may receive video information (or signal), audio signal (or signal), data or user input information from the input unit.

The artificial intelligence unit 130 may collect an enormous amount of information on the background in real time, learn the information, process the information into an appropriate format (e.g., a knowledge graph, a command policy, a personalization database, a dialog engine, etc.), and store the processed information in the memory 170.

The artificial intelligence unit 130 may predict operation of the mobile terminal based on information learned using machine learning technology, control the components of the mobile terminal in order to perform the predicted operation or deliver a control command for performing the predicted operation to the controller 180. The controller 180 may control the mobile terminal based on the control command to perform the predicted operation.

When specific operation is performed, the artificial intelligence unit 130 may analyze history information indicating the performed specific operation through machine learning technology and update previously learned information based on the analyzed information. The artificial intelligence unit 130 may improve information prediction accuracy.

Meanwhile, in this specification, the artificial intelligence unit 130 and the controller 180 may be understood as the same component. In this case, the function performed by the controller 180 described in this specification may be described as being performed by the artificial intelligence unit 130. The controller 180 may be referred to as the artificial intelligence unit 130 or the artificial intelligence unit 130 may be referred to as the controller 180.

In contrast, in this specification, the artificial intelligence unit 130 and the controller 180 may be understood as different components. In this case, the artificial intelligence unit 130 and the controller 180 may exchange data with each other to perform a variety of control on the mobile terminal. The controller 180 may perform at least one function on the mobile terminal and control at least one of the components of the mobile terminal, based on the result derived from the artificial intelligence unit 130. Further, the artificial intelligence unit 130 may operate under control of the controller 180.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTHTM, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type pictureelectric sensor, a direct reflective type pictureelectric sensor, a mirror reflective type pictureelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a picture sensor (or image sensors), and a laser sensor.

Implementing the camera 121 with a laser sensor may allow detection of a touch of a physical object with respect to a 3D stereoscopic image. The picture sensor may be laminated on, or overlapped with, the display device. The picture sensor may be configured to scan movement of the physical object in proximity to the touch screen. In more detail, the picture sensor may include picture diodes and transistors at rows and columns to scan content received at the picture sensor using an electrical signal which changes according to the quantity of applied light. Namely, the picture sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EE-PROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, a first and a second audio output modules 151a/151b, a proximity sensor 141, an illumination sensor 142, an optical output module 154, a first and a second cameras 121a/121b, a first and a secondmanipulation units 123a/123b, a microphone 122, interface unit 160 and the like.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the secondmanipulation unit 123b, the microphone 122 and interface unit 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
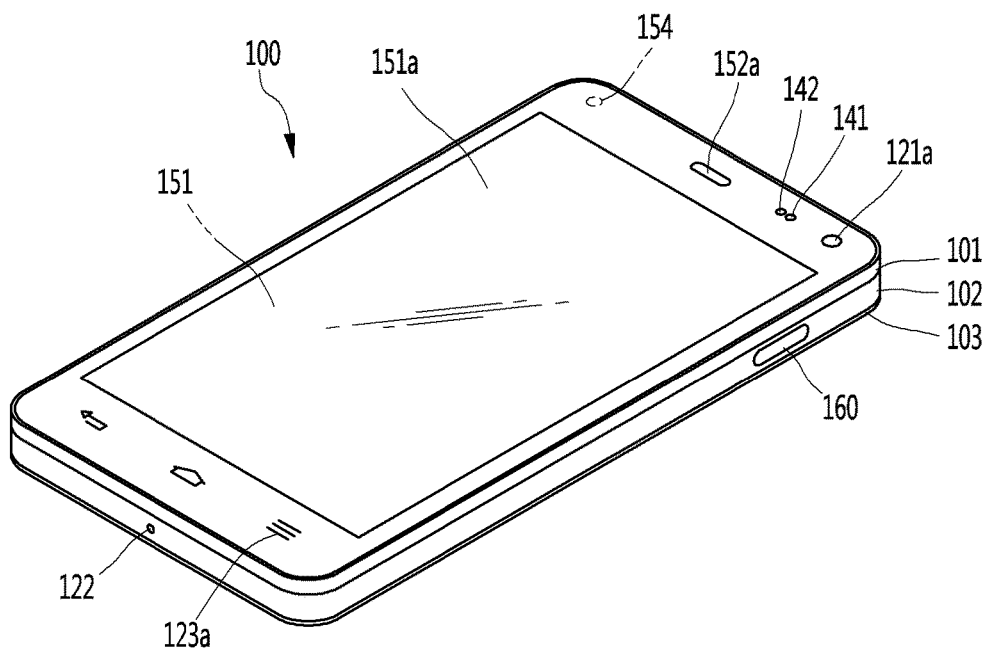
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state(or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
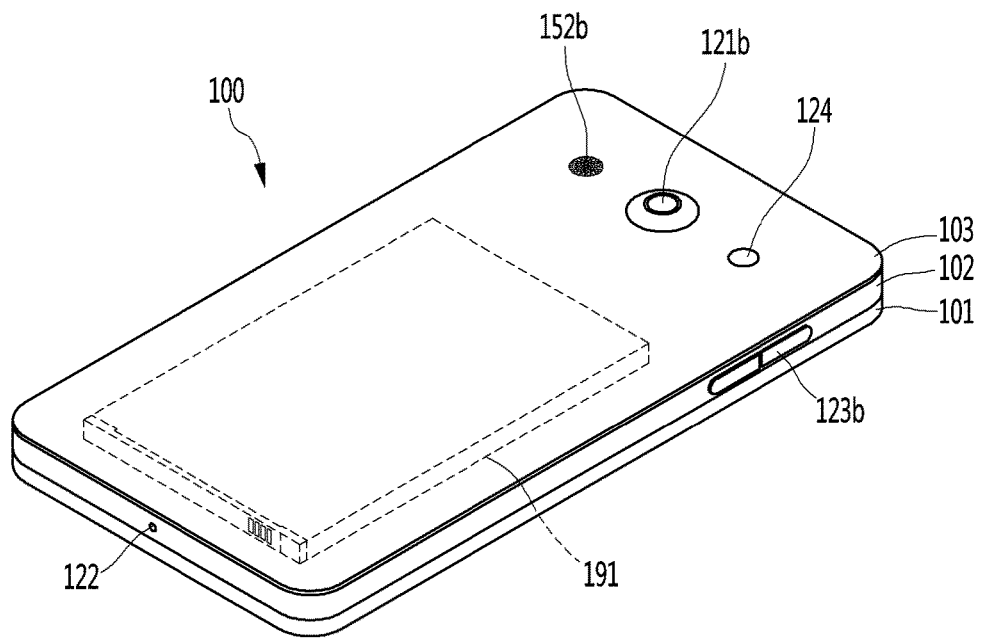
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 and a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
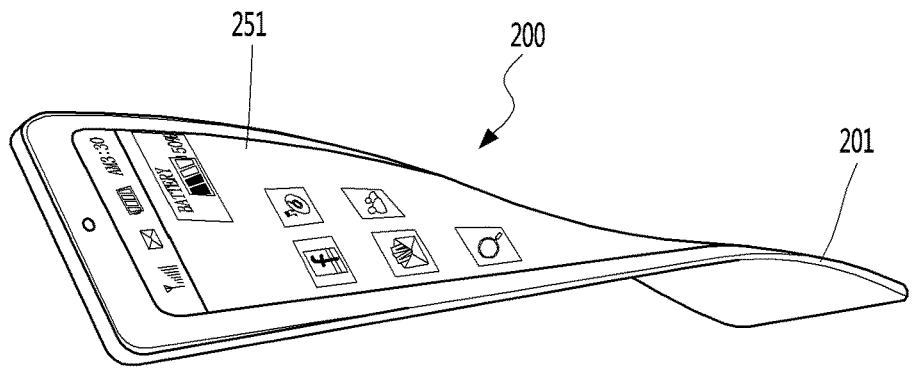
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A(Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power(RSRP), reference signal received quality(RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), UltraWideband (UWB), ZigBee, Near Field Communication (NFC), Wireless USB(Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P(Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital picture and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Figure 5:
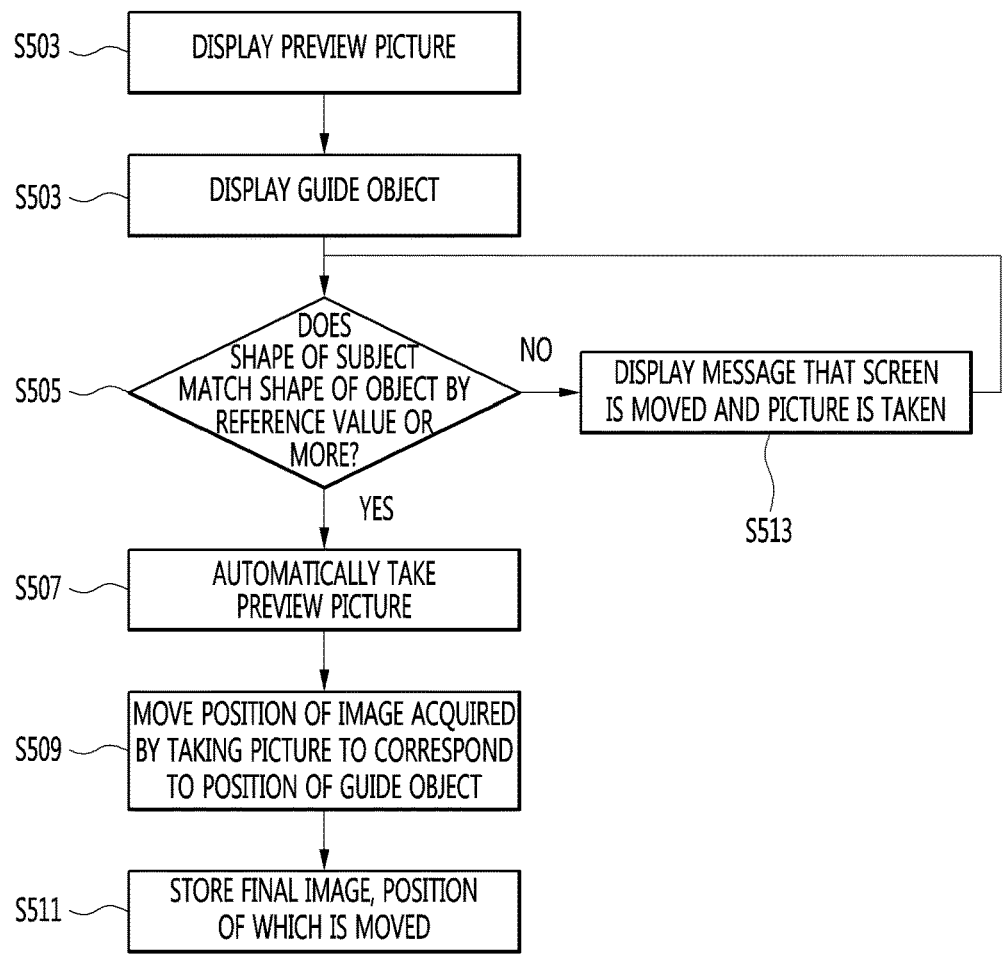
FIG. 5 is a flowchart illustrating a method of operating a mobile terminal according to an embodiment of the present invention.

FIG. 5 is a flowchart illustrating a method of operating a mobile terminal according to an embodiment of the present invention.

The controller 180 of the mobile terminal 100 displays a preview picture acquired through the camera 121 on the display unit 151 (S501).

The controller 180 displays a guide object stored in the memory 170 on the display unit 151 (S503).

In one embodiment, the guide object stored in the memory 170 may be displayed according to user selection before acquiring the preview picture through the camera 121.

In another embodiment, a default guide object may be set. The default object may be recently used guide object.

In another embodiment, the guide object may be recommended by the artificial intelligence unit 130 based on the shape of a subject included in the preview picture, which will be described below.

The guide object refers to an object for enabling the user to take a picture of a subject according to a guide and may include any one of a guide photo, a guide region having an area, a guide thumbnail image and a guide line.

The guide object may be generated according to user settings and a plurality of default guide objects may be stored.

A process of generating a guide object will be described below.

The controller 180 determines whether the shape of the subject and the shape of the guide object match by a reference value or more (S505).

In one embodiment, the controller 180 may determine that the shape of the subject and the shape of the guide object match by the reference value or more, if the shape of the outline forming the guide region and the shape of the outline forming a portion of the subject match by the reference value or more.

In another embodiment, if the area of the guide region and the area of the subject match by the reference value or more, it may be determined that the shape of the subject and the shape of the guide object match by the reference value or more.

The controller 180 automatically takes the preview picture if the shape of the subject and the shape of the guide object match by the reference value or more (S507).

In one embodiment, the controller 180 may automatically take the preview picture and store the taken picture if the shape of the subject and the shape of the guide object match by the reference value or more.

In one embodiment, the controller 180 may automatically take the preview picture while outputting one or more of a message or an alarm indicating that the preview picture is taken immediately or after a predetermined time, if the shape of the subject and the shape of the guide object match by the reference value or more.

In another embodiment, the controller 180 may increase transparency of the guide object if the shape of the subject and the shape of the guide object match by the reference value or more.

In another embodiment, the controller 180 may change the color of the guide object if the shape of the subject and the shape of the guide object match by the reference value or more.

The controller 180 performs correction for moving the position of the image obtained by taking a picture according to the position of the guide object (S509).

The camera 121 may acquire an additional image corresponding to an additional acquirable region in addition to the preview picture displayed on a preview screen.

The additional picture may be included in the whole picture capable of being acquired by a charge coupled device (CCD) of the camera 121.

That is, the whole picture capable of being acquired by the CCD of the camera 121 may be the preview picture and the additional picture.

The controller 180 may move the position of the whole picture acquired by taking a picture to correspond to the position of the guide object. A whole image may include a preview image corresponding to the preview picture and an additional image corresponding to the additional picture.

The user may acquire an image corresponding to the guide object even when the position of the subject included in the preview picture does not move to correspond to the position of the guide object.

The controller 180 stores the corrected final image in the memory 170 (S511).

In one embodiment, the controller 180 may store the original image acquired by taking the preview picture before correction and the corrected final image in the memory 170.

In one embodiment, the controller 180 may display the corrected final image on the display unit 151.

In one embodiment, the controller 180 may reproduce the final image in response to reception of a reproduction request. If a plurality of final images is acquired by taking a picture plural times, the controller 180 may continuously reproduce the plurality of final images in response to reception of the reproduction request.

In this case, the reproduction request may be a moving image graphics interchange format (GIF) reproduction request. The moving image GIF reproduction request may be a request for continuously reproducing the plurality of final images like moving pictures.

The controller 180 displays a message indicating that a picture is taken after moving the screen of the display unit 151 (S513), if the shape of the subject and the shape of the guide object do not match by the reference value or more.

Hereinafter, steps S501 to S513 will be described in detail.

FIGS. 6a to 6d are diagrams illustrating a process of automatically taking a preview picture using the shape of a guide object and the shape of a subject and automatically correcting the taken image according to an embodiment of the present invention.

Figure 6A:
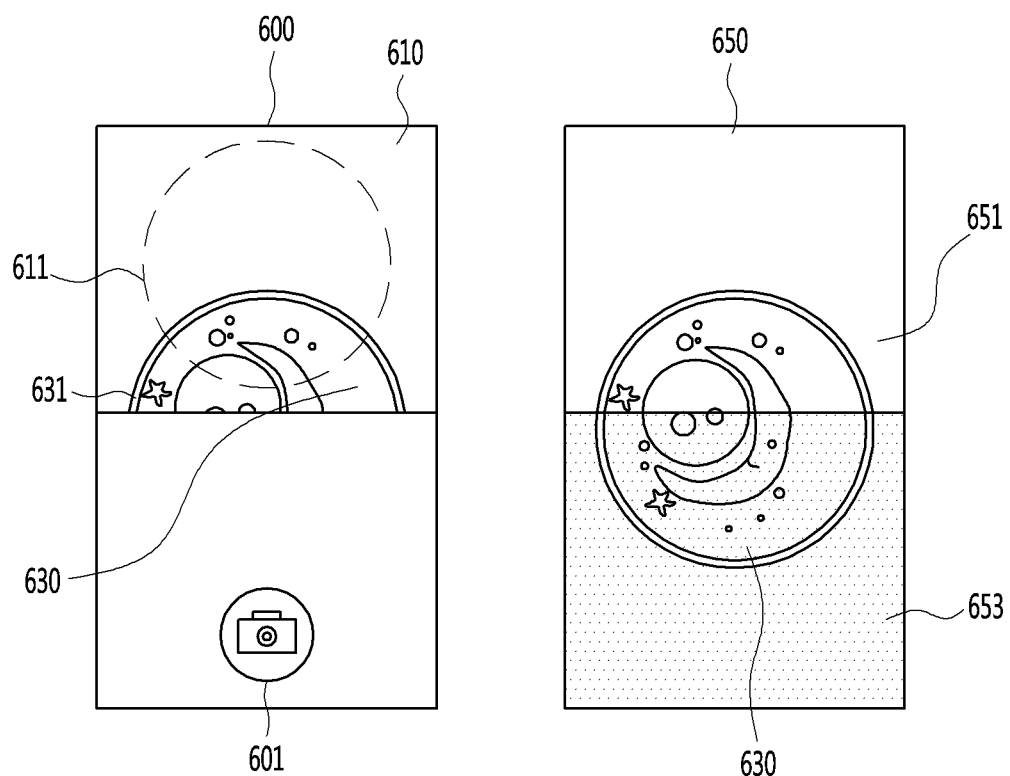
FIGS. 6a to 6d are diagrams illustrating a process of automatically taking a preview picture using the shape of a guide object and the shape of a subject and automatically correcting the taken image according to an embodiment of the present invention.

First, referring to FIG. 6a, the display unit 151 of the mobile terminal 100 displays a preview screen 600.

The preview screen 600 may include a preview picture 610 acquired through the camera 121.

In the preview picture 610, only a portion of the subject 630 may be displayed and an outline 631 forming the portion of the subject 630 is shown.

In the preview picture 610, a guide object 611 may be displayed. Here, assume that the guide object 611 is a circular guide region having a predetermined area.

The controller 180 may automatically take the preview picture 610 if the shape of the outline forming the circular guide region 611 and the shape of the outline 631 forming the portion of the subject 630 match by a reference value or more. The reference value may be 90%, which is merely exemplary.

The controller 180 may automatically take the preview picture 610 without input for selecting a camera button 601.

The controller 180 may acquire an additional picture corresponding to a region acquirable by the CCD upon taking the preview picture 610. More specifically, the controller 180 may acquire a whole image 650 including a preview image 651 corresponding to the preview picture 610 and an additional image 653 corresponding to the additional picture.

The whole shape of the subject 630 may appear in the whole image 650.

The preview image 651 may be referred to as an original image.

Figure 6B:
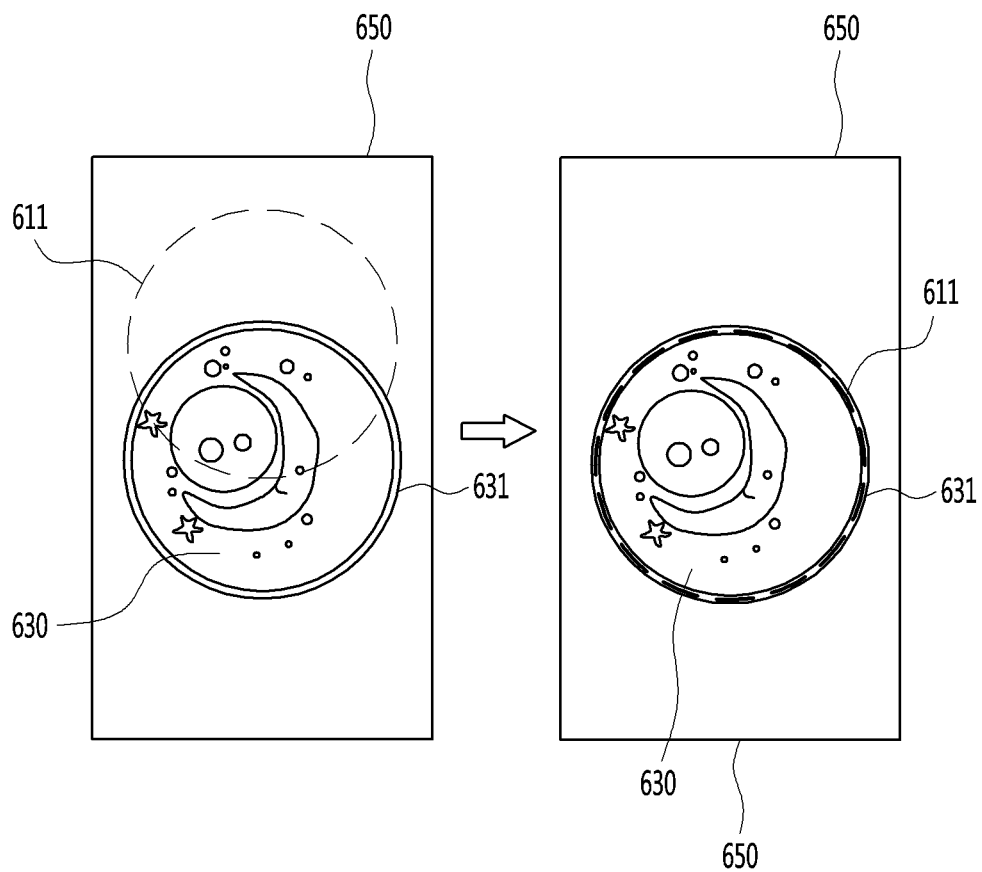

The controller 180 may move the whole image 650 upward such that the shape of the circular guide region 611 matches that of the subject 630, as shown in FIG. 6b.

Figure 6C:
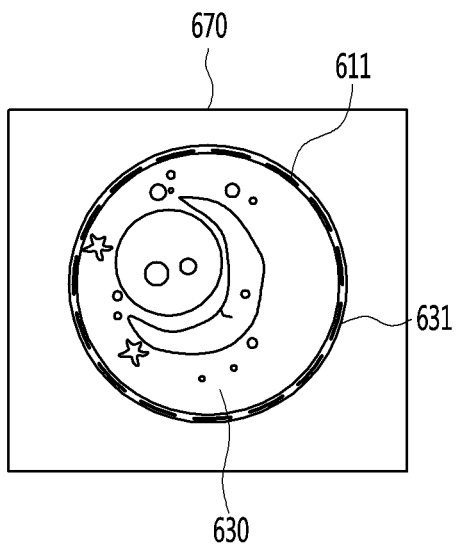

The controller 180 may acquire a final image 670 including the subject 630, as shown in FIG. 6c, if the shape and position of the circular guide region 650 are equal to those of the subject 630.

The controller 180 may store the final image 670 in the memory 170.

The controller 180 may reproduce or display the final image 670, instead of the preview image 651, when a request for reproducing the taken preview picture is received.

The user may easily acquire the image of the subject corresponding to the guide object even when the user does not move a screen to correspond to the guide object on the preview screen.

In another embodiment, the controller 180 may acquire the final image 670 upon taking the preview picture 610.

More specifically, the controller 180 may move the whole image 650 in at least one of upper, lower, left and right directions and then take a picture if the shape of the outline forming the circular guide region 611 matches the shape of the outline 631 forming the portion of the subject 630 by the reference value or more.

That is, unlike the embodiment in which the position of the whole image 650 is corrected such that the position of the subject 630 corresponds to that of the circular guide region 611 after taking the preview picture 610, a picture may be taken in a state in which the position of the subject 630 is automatically adjusted to correspond to that of the circular guide region 611.

Even when the screen is not moved to correspond to the guide object on the preview screen upon taking a picture, the user may easily acquire the image of the subject image corresponding to the guide object.

Figure 6D:
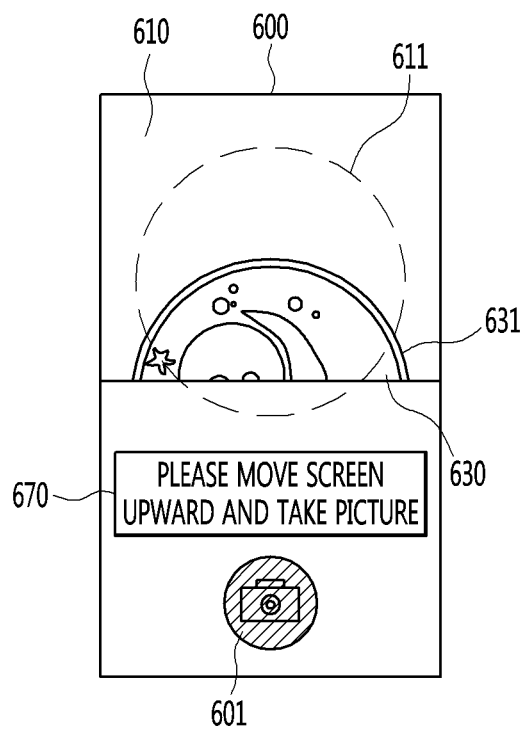

Meanwhile, the controller 180 may display a message 670 indicating that a picture is taken after moving the screen in a specific direction, as shown in FIG. 6d, if the shape of the outline forming the circular guide region 611 does not match that of the outline 631 forming the portion of the subject 630 by the reference value or more. Here, the specific direction may be a direction in which the shape of the subject 630 matches that of the circular guide region 611.

The controller 180 may display, on the preview screen 600, the message 670 indicating that the screen is moved in at least one of the upper, lower, left and right directions such that the shape of the subject 630 matches that of the circular guide region 611.

At the same time, the controller 180 may deactivate the camera button 601 such that the user cannot select the camera button 601. The camera button 601 may be dimmed.

Figure 7:
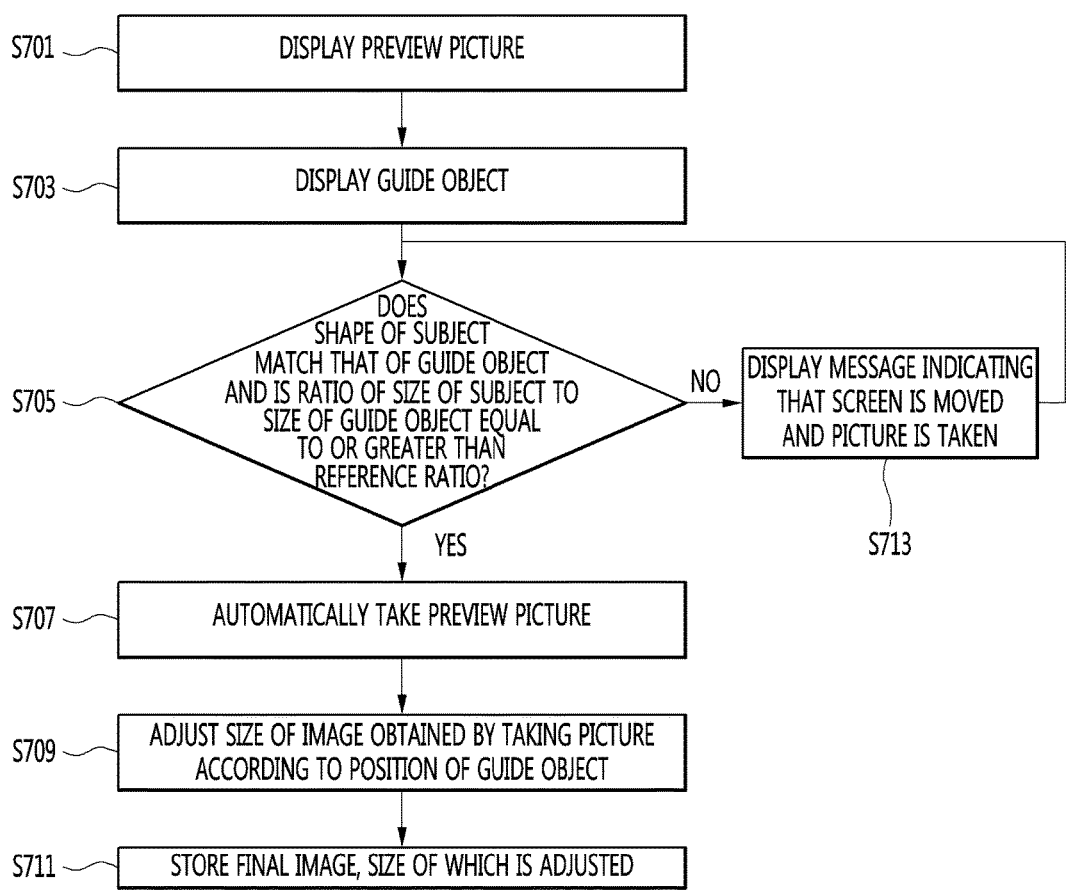
FIG. 7 is a flowchart illustrating a method of operating a mobile terminal according to another embodiment of the present invention.

FIG. 7 is a flowchart illustrating a method of operating a mobile terminal according to another embodiment of the present invention.

In the embodiment of FIG. 7, a description of the same portions as the embodiment of FIG. 7 will be omitted.

The controller 180 of the mobile terminal 100 displays a preview picture acquired through the camera 121 on the display unit 151 (S701).

The controller 180 displays a guide object stored in the memory 170 on the display unit 151 (S703).

The controller 180 determines whether the shape of the subject matches that of the guide object and a ratio of the size of the subject to the size of the guide object is equal to or greater than a reference ratio (S705).

In one embodiment, the shape of the subject matching that of the guide object means that the shape of the outline forming the subject matches that of the outline forming the guide object.

The size of each of the subject and the guide object may be the area of each of the subject and the guide object.

The controller 180 automatically takes the preview picture if the ratio of the size of the subject to the size of the guide object is equal to or greater than the reference ratio (S707).

Here, the reference ratio may be 80%, which is merely exemplary.

In one embodiment, the controller 180 may automatically take the preview picture while outputting one or more of a message or alarm indicating that the preview picture is taken, if the ratio of the size of the subject to the size of the guide object is equal to or greater than the reference ratio.

In another embodiment, the controller 180 may increase transparency of the guide object if the ratio of the size of the subject to the size of the guide object is equal to or greater than the reference ratio.

The controller 180 adjusts the size of the image acquired by taking a picture to correspond to the size of the guide object (S709).

The camera 121 may acquire the additional picture corresponding to the additionally acquirable region in addition to the preview picture displayed on the preview screen.

The additional picture may be included in the whole picture acquirable by the CCD of the camera 121.

That is, the whole picture acquirable by the CCD of the camera 121 may include the preview picture and the additional picture.

The controller 180 may adjust the size of the subject included in the image acquired by taking a picture to correspond to the size of the guide object.

Therefore, even when the user does not move the subject included in the preview picture according to the size of the guide object, it is possible to acquire the image matching the guide object.

The controller 180 stores the final image, the size of which has been adjusted, in the memory 170 (S711).

In one embodiment, the controller 180 may store the original image acquired by taking the preview picture before performing correction and the final image subjected to correction in the memory 170.

In one embodiment, the controller 180 may display the final image, the size of which has been adjusted, on the display unit 151.

In one embodiment, the controller 180 may reproduce the final image in response to reception of the reproduction request. If a plurality of final images is acquired by taking a picture plural times, the controller 180 may continuously reproduce the plurality of final images in response to reception of the reproduction request.

In this case, the reproduction request may be a moving image graphics interchange format (GIF) reproduction request. The moving image GIF reproduction request may be a request for continuously reproducing the plurality of final images like a moving picture.

Meanwhile, the controller 180 displays a message indicating that a picture is taken after moving the screen of the display unit 151 (S713), if the shape of the subject matches that of the guide object but the ratio of the size of the subject to the size of the guide object is less than the reference ratio.

As another example, the controller 180 may output a message indicating that the preview screen of the display unit 151 is enlarged or reduced such that the ratio of the size of the subject to the size of the guide object satisfies the reference ratio.

Hereinafter, steps S710 to S713 will be described.

Figure 8A:
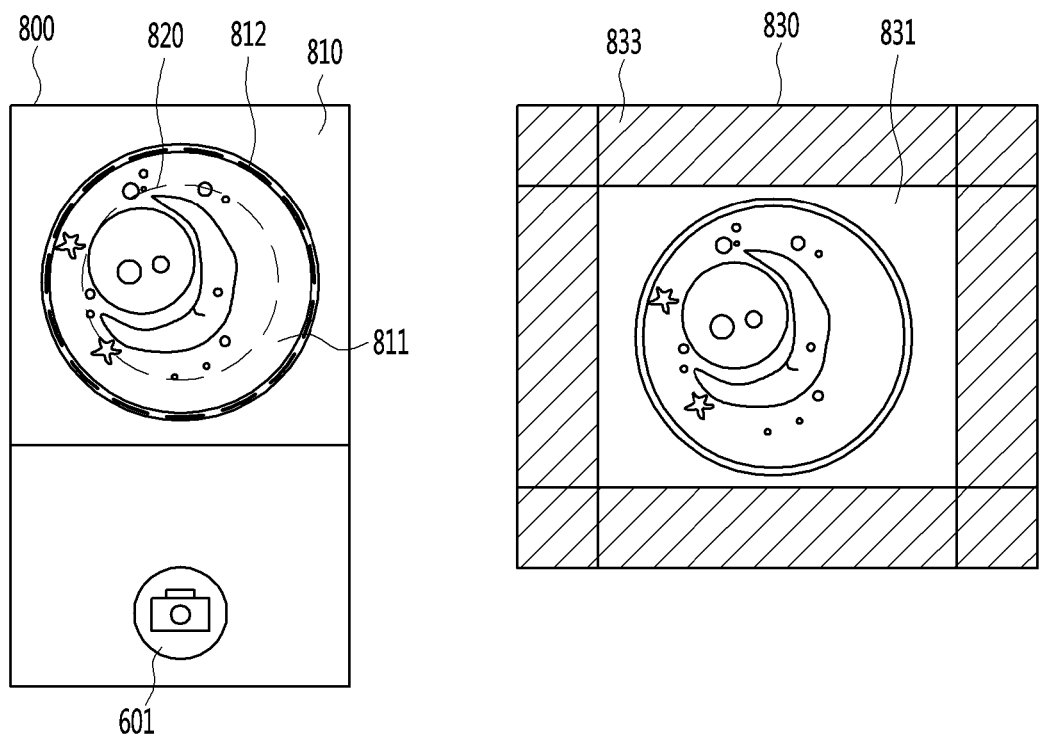
FIGS. 8a and 8b are diagrams illustrating a process of automatically capturing a preview picture using the size of a guide object and the size of a subject and automatically correcting the taken image according to an embodiment of the present invention.
Figure 8B:
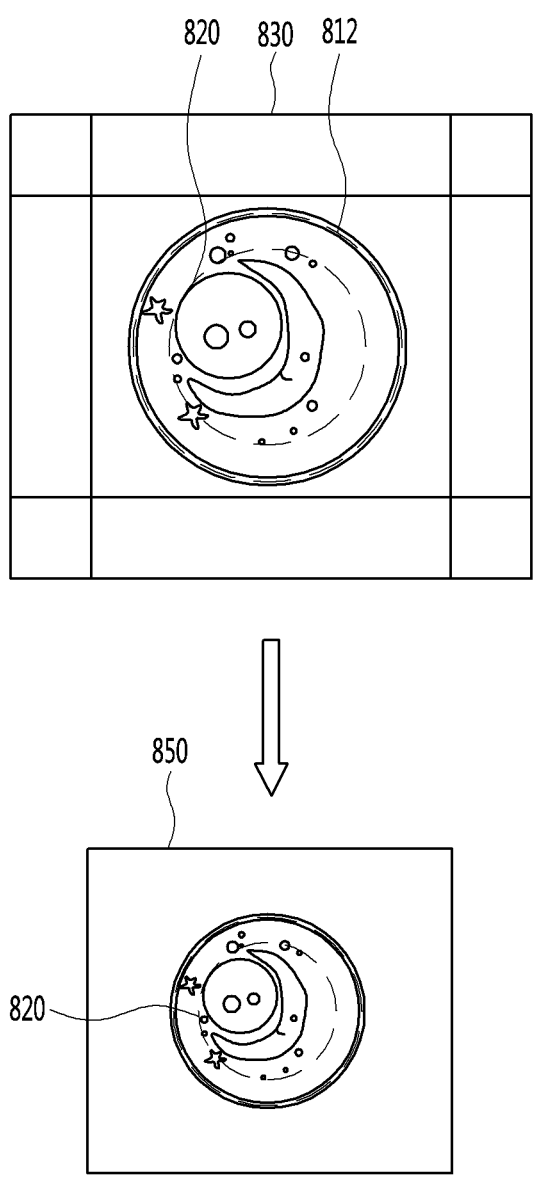

FIGS. 8*a* and 8*b* are diagrams illustrating a process of automatically taking a preview picture using the size of a guide object and the size of a subject and automatically correcting the taken image according to an embodiment of the present invention.

First, referring to FIG. 8*a*, the display unit 151 of the mobile terminal 100 displays a preview screen 800.

The preview screen 800 may include a preview picture 810 acquired through the camera 121.

In the preview picture 810, a subject 811 may be displayed and an outline 812 forming the subject 811 is shown.

In the preview picture 810, a guide object 820 for guiding the user to take a picture of a subject may be displayed. Here, the guide object 820 is a circular guide region having a predetermined area, for example.

In addition, assume that the shape of the outline 812 of the subject 811 matches that of the outline of the circular guide region 920.

The controller 180 may determine a ratio of the size of the circular guide region 820 to the size of a region formed by the outline 812 of the subject 811 (the size of the subject) is equal to or greater than a reference ratio.

The controller 180 may automatically take the preview picture 810 if the ratio of the size of the circular guide region 820 to the size of the subject 811 is equal to or greater than the reference ratio.

The controller 180 may acquire a whole image 830 including a preview image 831 corresponding to the preview picture 810 and an additional image 831 corresponding to an additional picture acquirable by the camera 121 upon taking the preview picture 810.

The controller 180 may reduce the whole image 830, as shown in FIG. 8*b*, such that the outline 812 of the subject 830 matches that of the circular guide region 820.

The controller 180 may acquire the reduced final image 850 if the outline 812 of the subject 830 matches that of the circular guide region 820.

The controller 180 may store the reduced final image 850 in the memory 170.

The controller 180 may reproduce the reduced final image 850, instead of the preview image 831, when a request for reproducing the taken preview image is received.

Therefore, it is possible to easily acquire the image of the subject corresponding to the guide object even when the screen is not moved to correspond to the guide object.

The memory 170 may store the preview image 831 and the reduced final image 850.

In another embodiment, the controller 180 may acquire the final image 670 upon taking the preview picture 610.

More specifically, the controller 180 may enlarge or reduce the whole image 650 and then take a picture if the ratio of the size of the circular guide region 611 to the size of the subject 630 is equal to or greater than the reference ratio.

That is, unlike the embodiment in which the size of the whole image 650 is corrected such that the size of the subject 630 corresponds to that of the circular guide region 611 after taking the preview picture 610, a picture may be taken in a state in which the size of the subject 630 is automatically adjusted to correspond to that of the circular guide region 611.

Even when the screen is not moved to correspond to the guide object on the preview screen upon taking a picture, the user may easily acquire the image of the subject corresponding to the guide object.

As another example, the whole image 830 may be reduced and the position of the whole image 830 may be moved such that the outline 812 of the subject 811 matches that of the circular guide region 8210.

Therefore, a final image 850 may be acquired.

Next, a process of generating the guide object will be described.

The generated guide object may be displayed in the preview picture in step S503 of FIG. 5 or step S703 of FIG. 7.

Figure 9:
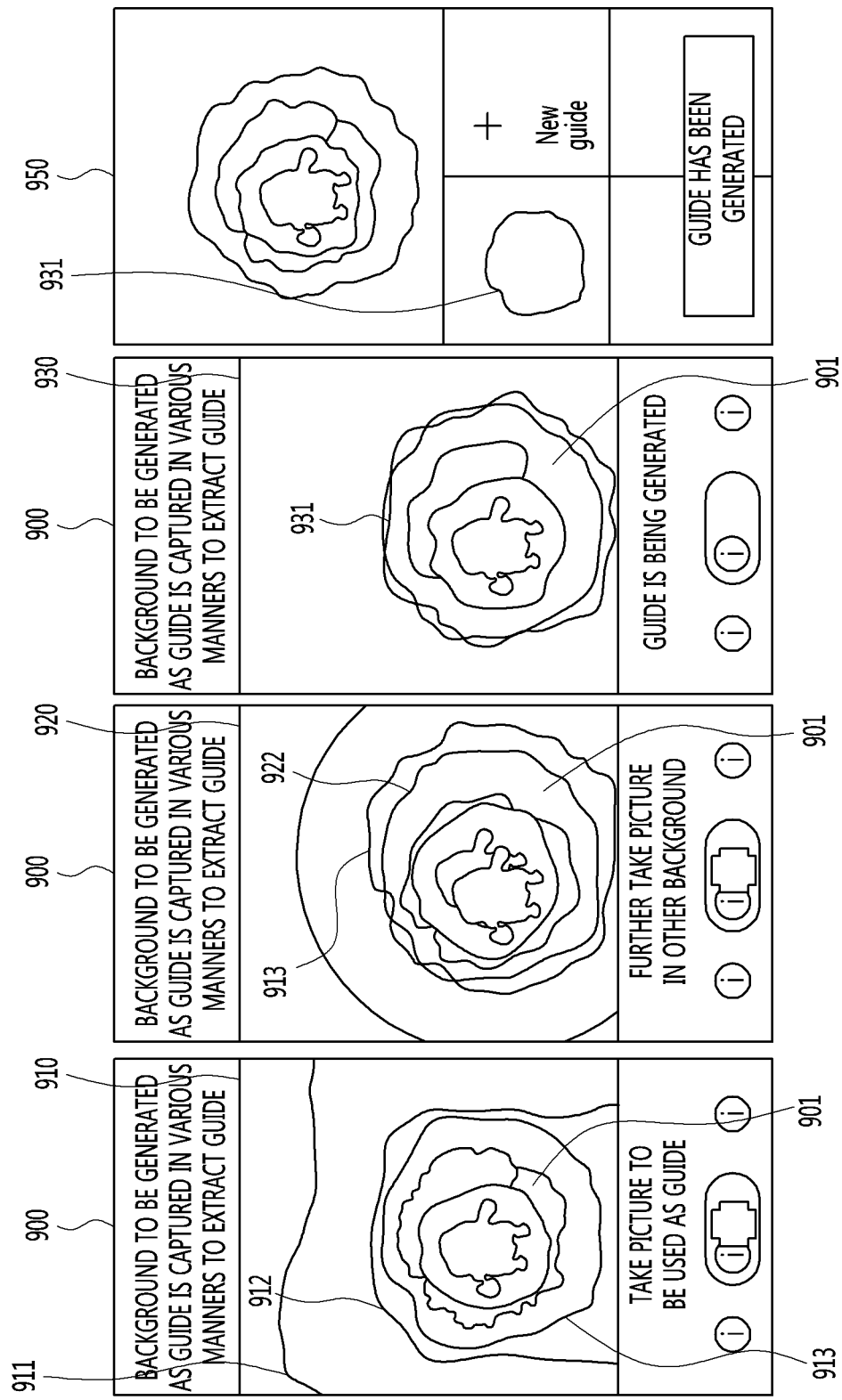
FIG. 9 is a diagram illustrating a process of generating a guide object by taking a picture g according to an embodiment of the present invention.

FIG. 9 is a diagram illustrating a process of generating a guide object by taking a picture according to an embodiment of the present invention.

In particular, FIG. 9 illustrates a process of taking a picture of the same subject and generating a guide object while changing a background.

Referring to FIG. 9, the display unit 151 of the mobile terminal 100 displays a preview screen 900 according to execution of a camera application.

The preview screen 900 may include a first preview picture acquired through the camera 121.

The controller 180 may take the first preview picture and extract a plurality of guide objects 911, 912 and 913 from a first preview image 910 according to the result of taking the picture.

The guide object 913 forming the outline of the subject 901 of the plurality of guide objects 911, 912 and 913 may be displayed distinguishably from the other guide objects 911 and 912.

The controller 180 overlaps the first preview image 910 with the background and displays a second preview picture having the same subject 901 and a different background.

The controller 180 may take the second preview picture overlapping the first preview image 910 and acquire a second preview image 920.

The controller 180 may compare the value of the background color of the first preview image 910 with the value of the background color of the second preview image 920 and control the guide objects 911 and 921 corresponding to a region in which the value of the background color of the first preview image 910 is different from the value of the background color of the second preview image 920.

Of course, a new guide object 922 may be extracted from the second preview image 920.

If the above process is repeated predetermined times or more and only one of the plurality of extracted guide objects is left, the controller 180 may generate the left guide object 931 as a final guide object.

The generated guide object 931 may appear on the below-described guide overlapping screen 950.

The user may generate a guide object having a desired structure by taking a picture.

Figure 10B:
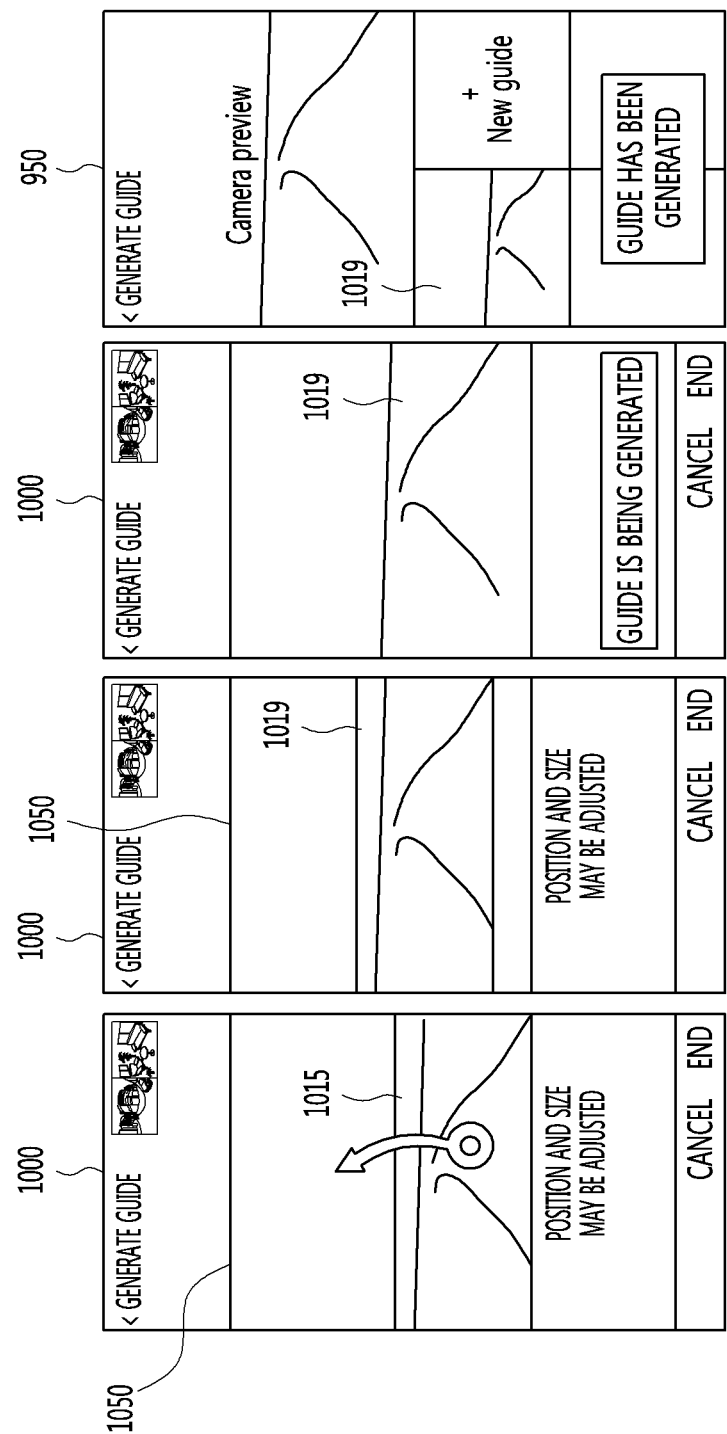

Next, a description is given with reference to FIGS. 10*a* and 10*b*.

FIGS. 10*a* and 10*b* are diagrams illustrating a method of generating a guide using photos stored through a gallery application according to another embodiment of the present invention.

A gallery application may provide a photo or video captured through the camera 121.

Referring to FIG. 10*a*, a gallery guide generation screen 100 is shown.

The gallery guide generation screen 1000 may include a guide object provision screen 1010 and a photo list 1030.

When a first photo 1031 is selected from among a plurality of photos included in the photo list, the controller 180 may display a first guide object 1011 corresponding to the selected first photo 1031 on the guide object provision screen 1010.

The first guide object 1011 may include a plurality of guide lines extracted from the selected photo 1031.

The first guide object 1011 may be changed according to flicking input for the guide object provision screen 1010. That is, the extracted guide lines may be changed.

Meanwhile, if a second photo 1033 is selected from among the plurality of photos, the controller 180 may compare the plurality of guide lines corresponding to the first photo 1031 with the plurality of guide lines corresponding to the second photo 1033 and display a second guide object 1013 including common guide lines.

When the second guide object 1013 is selected, the controller 180 may dim photos 1035 which do not include the guide line common to the second guide object 1013 on the photo list 1030.

Meanwhile, in the case of a photo registered by the user as a favorite or frequently transmitted by the user to a counterpart, the controller 180 may automatically generate and provide the guide object of the photo upon display of the guide object provision screen 1011.

Meanwhile, the guide object displayed on the guide object provision screen 1011 may correspond to the number of photos. For example, the controller 180 may display a message indicating that the guide object is generated using only three photos having similar structures.

On the gallery guide generation screen 1000, an indicator 1017 indicating that a second guide object 1015 has been generated using the first and second photos is displayed.

The position and size of the generated second guide object 1015 may be changed.

Referring to FIG. 10*b*, a guide object editing region 1050 for editing the second guide object 1015 may be displayed on the gallery guide generation screen 1000.

The controller 180 may display an edited guide object 1019 in response to a request for changing the position or size of the second guide object 1015.

The edited guide object 1019 may appear on the guide overlapping screen 950 later.

Next, an example of generating a guide object using a photo searched through a social network service will be described.

FIG. 11*a* is a diagram illustrating an example of generating a guide object using a photo searched for using a social network guide according to an embodiment of the present invention, and FIG. 11*b* is a diagram illustrating a process of uploading a photo to a social network service using a generated guide object.

Referring to FIG. 11*a*, an SNS guide generation screen 1100 is shown.

The SNS guide generation screen 110 may include a search handler 1110 for hash tag search.

If a specific hash tag is input to the search handler 1110 through a keyboard input window 1130, the controller 180 may search for photos corresponding to the specific hash tag.

The controller 180 may extract photos most recommended by persons from among the searched photos and acquire guide objects corresponding to the extracted photos.

The acquired guide objects may be displayed on a search guide list 1150. If the guide object 1151 included in the search guide list 1150 is selected, the controller 180 may display a guide overlapping screen 1170 as shown in FIG. 11*b*.

The guide overlapping screen 1170 may include a preview screen 1171 and a previously taken image 1173 located below the preview screen 1171.

A guide object 1151 selected in FIG. 11*a* may be displayed on the preview screen 1171. The guide object 1151 may be a guide photo.

If the camera 121 is turned on, the controller 180 may overlap and display the guide object 1151 and the preview picture 1174 on the preview screen 1171.

The controller 180 may display the taken image 1175 corresponding to the preview picture 1174 on the lower end of the preview screen 1171, if the camera button 601 is selected.

The taken image 1175 may be provided through the gallery application.

Thereafter, the controller 180 may display an execution screen 1180 of the gallery application if a gallery icon 1465 is selected.

The controller 180 may upload the taken image 1175 to the server for providing a social network service according to user input on the execution screen 1180 of the gallery application.

The uploaded taken image 1175 may be displayed on a social network service application screen 1190 along with the hash tag 1191.

The user may generate a guide object using a social network service and share the taken image with another user using the generated guide object.

Next, an example of generating a guide object using user touch input will be described.

Figure 12:
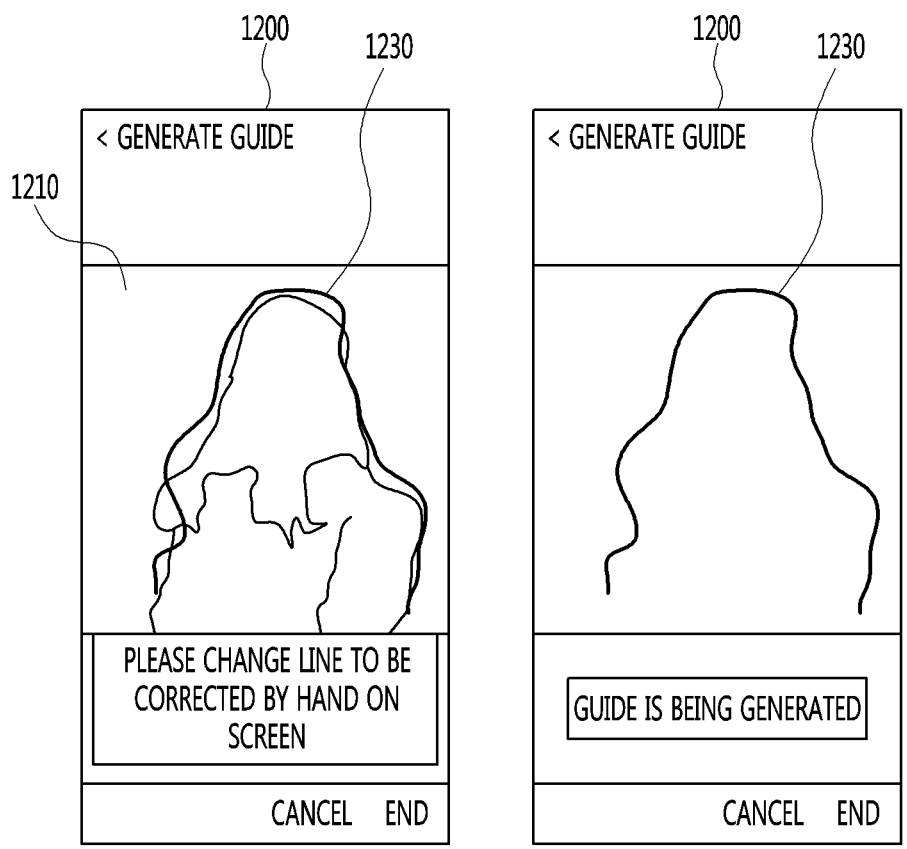
FIG. 12 is a diagram illustrating a process of generating a guide object using user touch input according to an embodiment of the present invention.

FIG. 12 is a diagram illustrating a process of generating a guide object using user touch input according to an embodiment of the present invention.

Referring to FIG. 12, a touch input guide generation screen 1200 is shown.

The touch input guide generation screen 1200 may include an image 1210 taken by the user through the camera 121.

The controller 180 may receive touch input moving along the outline of the image 1210 and display a guide line 1230 drawn by touch input if touch input is finished.

The controller 180 may generate and store the guide line 1230 according to a generation request.

Next, an example of recommending a guide line using a guide object corresponding to a photo stored in the memory 170 will be described.

Figure 13:
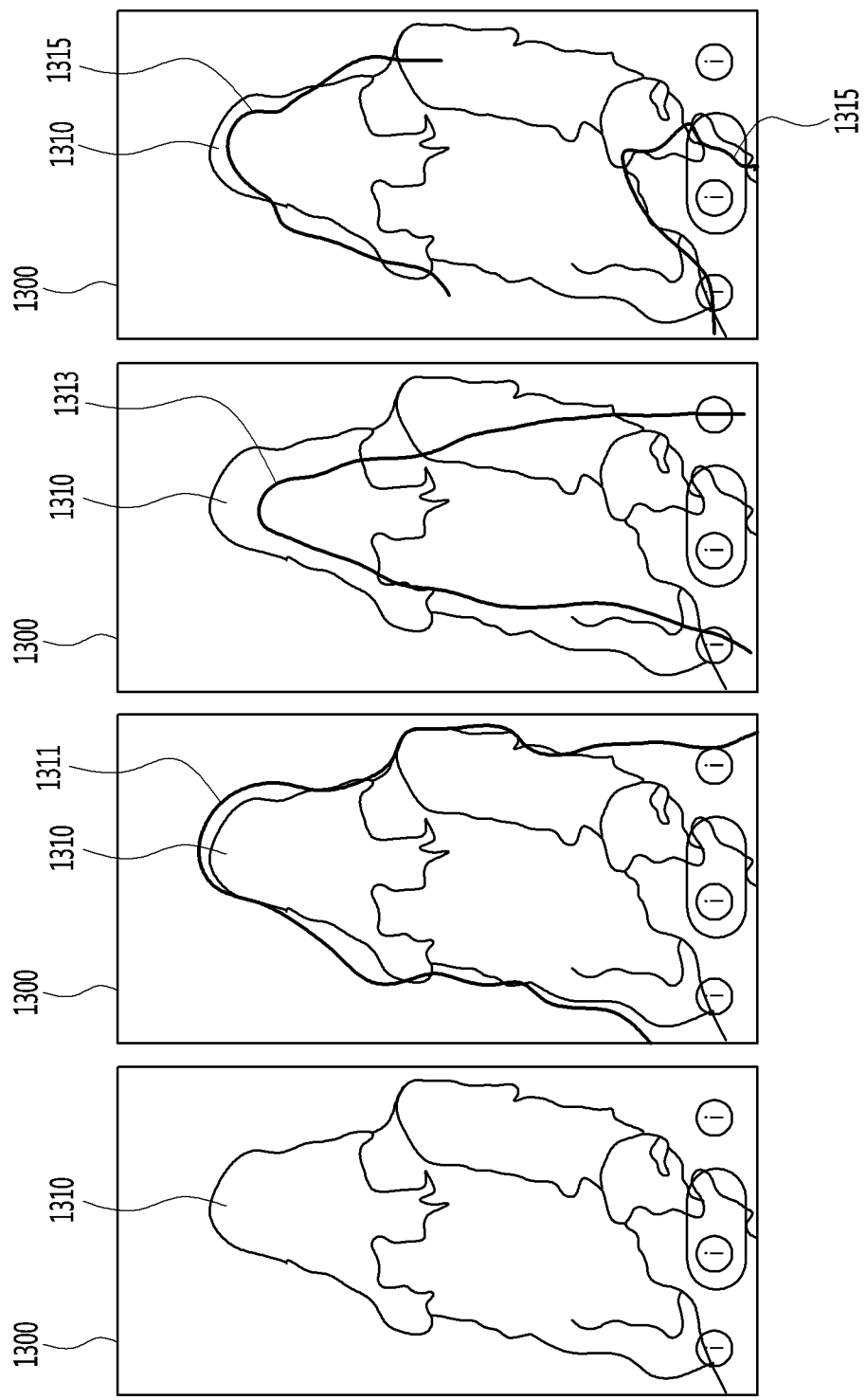
FIG. 13 is a diagram illustrating a process of recommending a guide object using a guide object corresponding to a photo stored in a memory according to an embodiment of the present invention.

FIG. 13 is a diagram illustrating a process of recommending a guide object using a guide object corresponding to a photo stored in a memory according to an embodiment of the present invention.

The recommended guide object may be displayed in step S503 of FIG. 5 and step S703 of FIG. 7.

Referring to FIG. 13, a preview picture 1300 including an object 1310 is shown.

If an object 1310 is present in the preview picture 1300 for a predetermined time or more, the controller 180 may extract a plurality of guide objects corresponding to photos, the shapes of which match that of the object 1310 by a reference value or more, from among the photos stored in the memory 170.

The controller 180 may display any one of the plurality of extracted guide objects 1311 on the preview picture 1300.

The controller 180 may change the guide object 1311 to other guide objects 1313 and 1315 in response to left-direction or right-direction flicking input.

A guide object having a shape similar to that of a subject, the picture of which is currently taken, may be rapidly recommended to a user.

Next, an interface screen for overlapping and providing a guide object upon taking a picture of a subject through the camera 121 will be described.

Figure 14A:
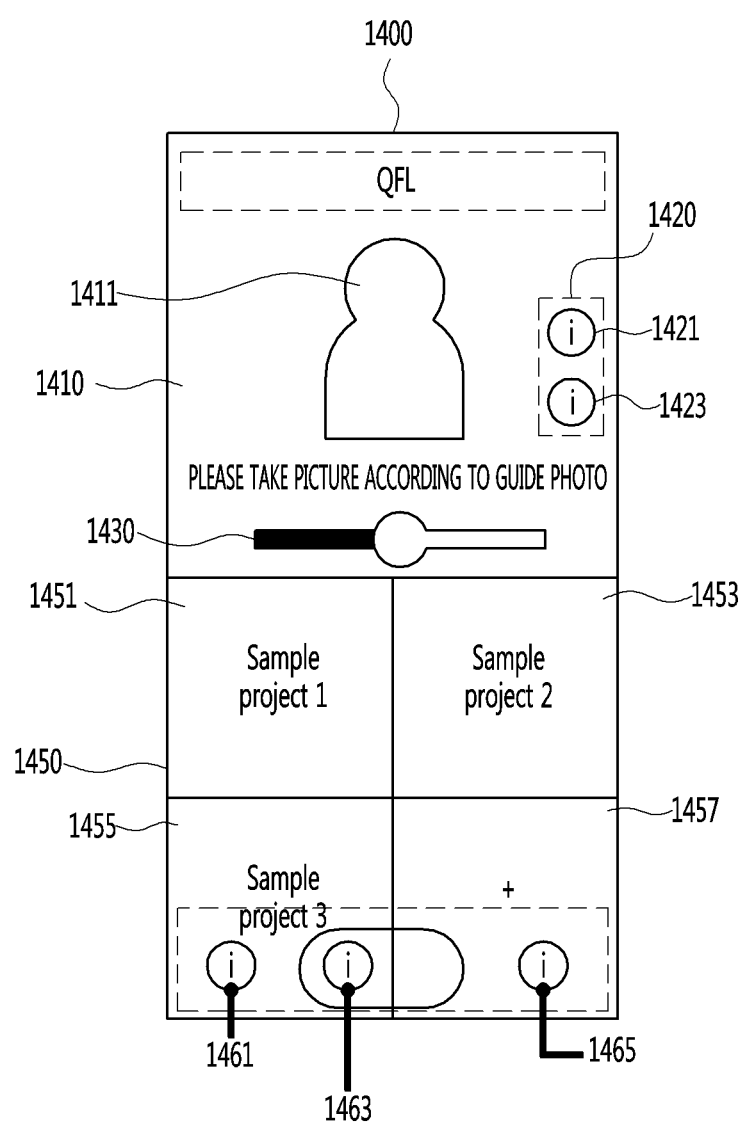
FIGS. 14a and 14b are diagrams illustrating a guide overlapping screen capable of providing a guide object upon capturing a subject according to an embodiment of the present invention.
Figure 14B:
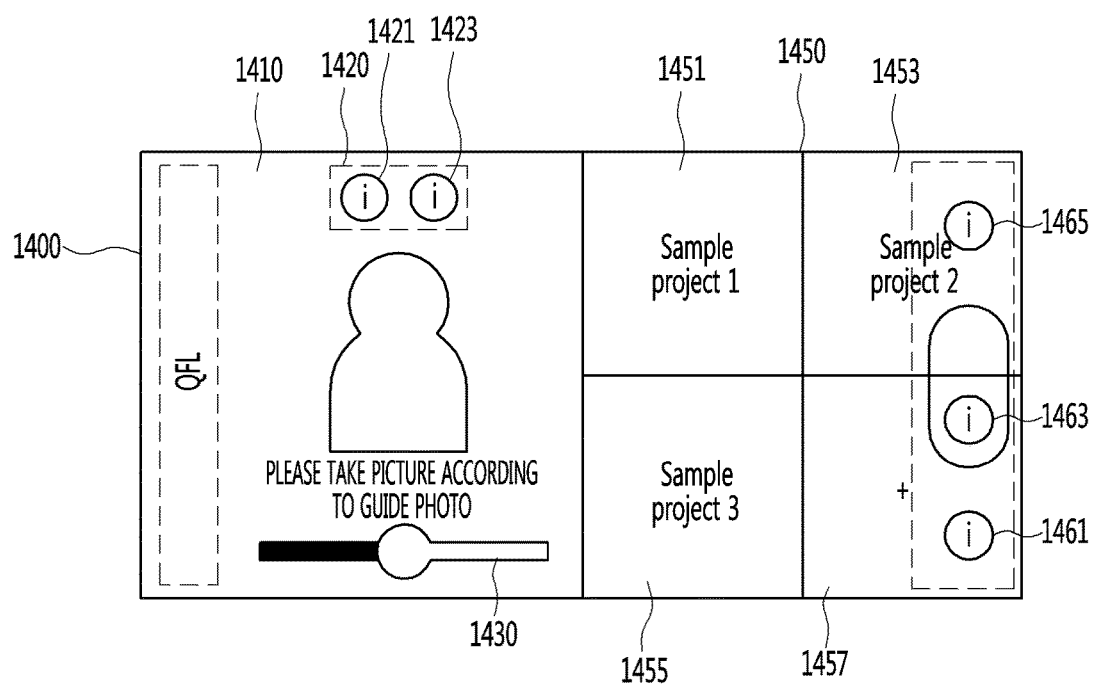

FIGS. 14a and 14b are diagrams illustrating a guide overlapping screen capable of providing a guide object upon taking a picture of a subject according to an embodiment of the present invention.

FIG. 14a shows a guide overlapping screen 1400 displayed when the mobile terminal 100 operates in a portrait mode and FIG. 14b shows a guide overlapping screen 1400 displayed when the mobile terminal 100 operates in a landscape mode.

Referring to FIGS. 14a and 14b, the guide overlapping screen 1400 may include a preview screen 1410 and a project view screen 1450.

The preview screen 1410 may be a screen on which a picture acquired through the camera 121 is displayed.

On the preview screen 1410, a preview picture, a guide object 1411, a camera selection icon 1420 and a transparency adjustment bar 1430 may be displayed.

The guide object 1411 may be an object for guiding the user to take a picture. The guide object 1411 may be any one of a line, a region or a photo.

The guide object 1411 may correspond to any one selected sample project on the project view screen 1450.

The camera selection icon 1420 may include a front camera icon 1421 for activating a front camera 121a and a rear camera icon 1423 for activating a rear camera 121b.

Here, activation may indicate powering on.

The transparency adjustment bar 1430 may be used to adjust transparency of the guide object 1411.

The project view screen 1450 may include a plurality of sample projects 1451, 1453 and 1455 and an addition project 1457.

Although a ratio of the preview screen 1410 to the project view screen 1450 is 1:1, this is merely exemplary and may be changed according to user settings.

Each of the plurality of sample projects 1451, 1453 and 1455 may be a sample photo stored by default.

If any one of the plurality of sample projects 1451, 1453 and 1455 is selected, the controller 180 may display the guide object 1411 corresponding to the selected sample project on the preview screen 1410.

Thumbnail images of a first sample project 1451 may be provided on the first sample project 1451 in a slideshow manner. Although three thumbnail images may be provided, this is merely exemplary. Here, the thumbnail images may be sample images having a first guide object.

A scroll bar may be further displayed at one side of the project view screen 1450. The scroll bar may be used to provide sample projects other than the first, second and third sample projects 1451 and 1453 and 1455. The user may view the other sample projects through the scroll bar.

An addition project 1457 may be used to generate a new project, which will be described below.

The guide overlapping screen 1400 may further include a back button 1461, a camera button 1463 and a gallery icon 1465 for providing the thumbnails stored through the gallery application.

Figure 15:
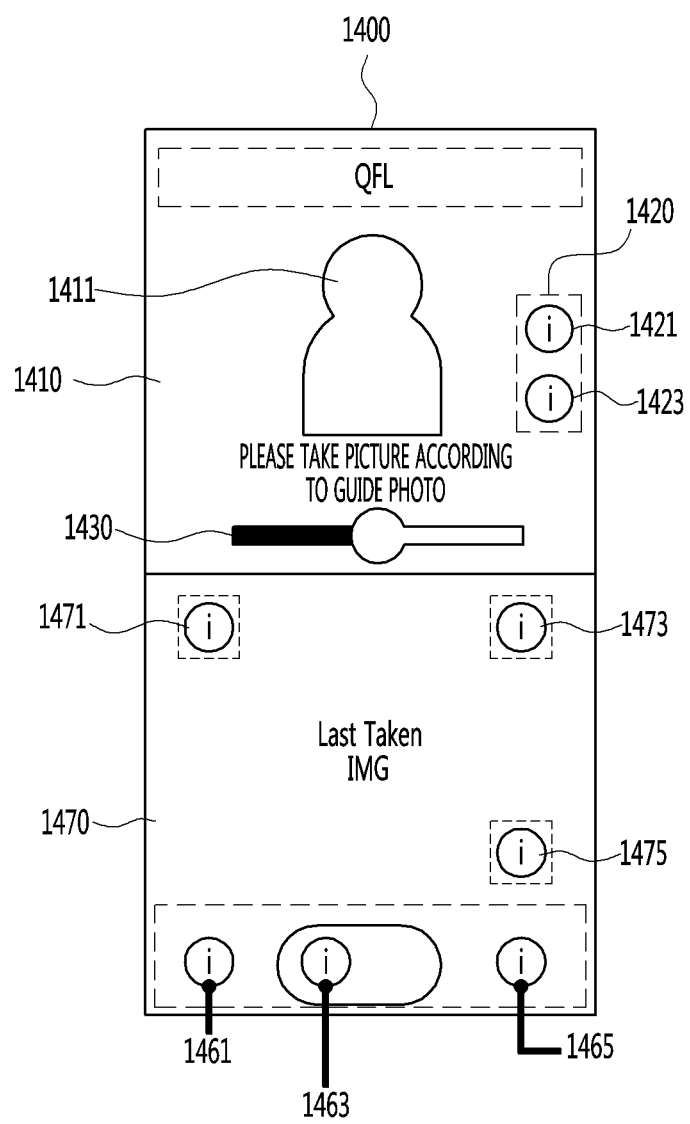
FIG. 15 is a diagram illustrating an example of a guide overlapping screen according to another embodiment of the present invention.

FIG. 15 is a diagram illustrating an example of a guide overlapping screen according to another embodiment of the present invention.

FIG. 15 will be described in association with FIGS. 14a and 14b.

Referring to FIG. 15, a guide overlapping screen 1400 for taking a preview picture through the camera button 1463 shown in FIG. 14a or 14b and providing the taken image 1470 is shown.

That is, the project view screen 1450 is replaced with a last taken image 1470 using the guide object.

In this case, a project selection icon 1471 for displaying the project view screen 1450 again, a deletion icon 1473 for deleting the image 1470 and a sharing icon 1475 for sharing the image 1470 may be displayed on the guide overlapping screen 1400.

The project selection icon 1471 and the deletion icon may be displayed when the image 1470 is selected.

Figure 16B:
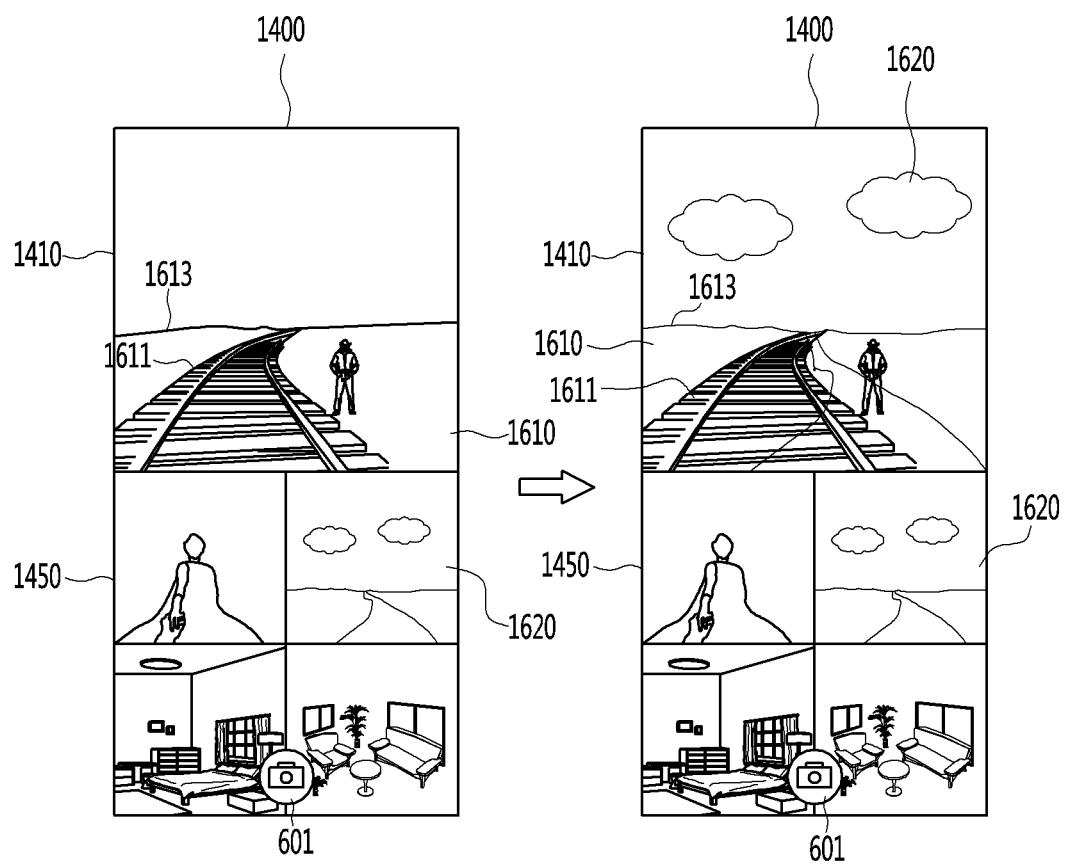
FIGS. 16b and 16c are diagrams illustrating an example of recommending a guide object based on a preview picture according to an embodiment of the present invention.
Figure 16C:
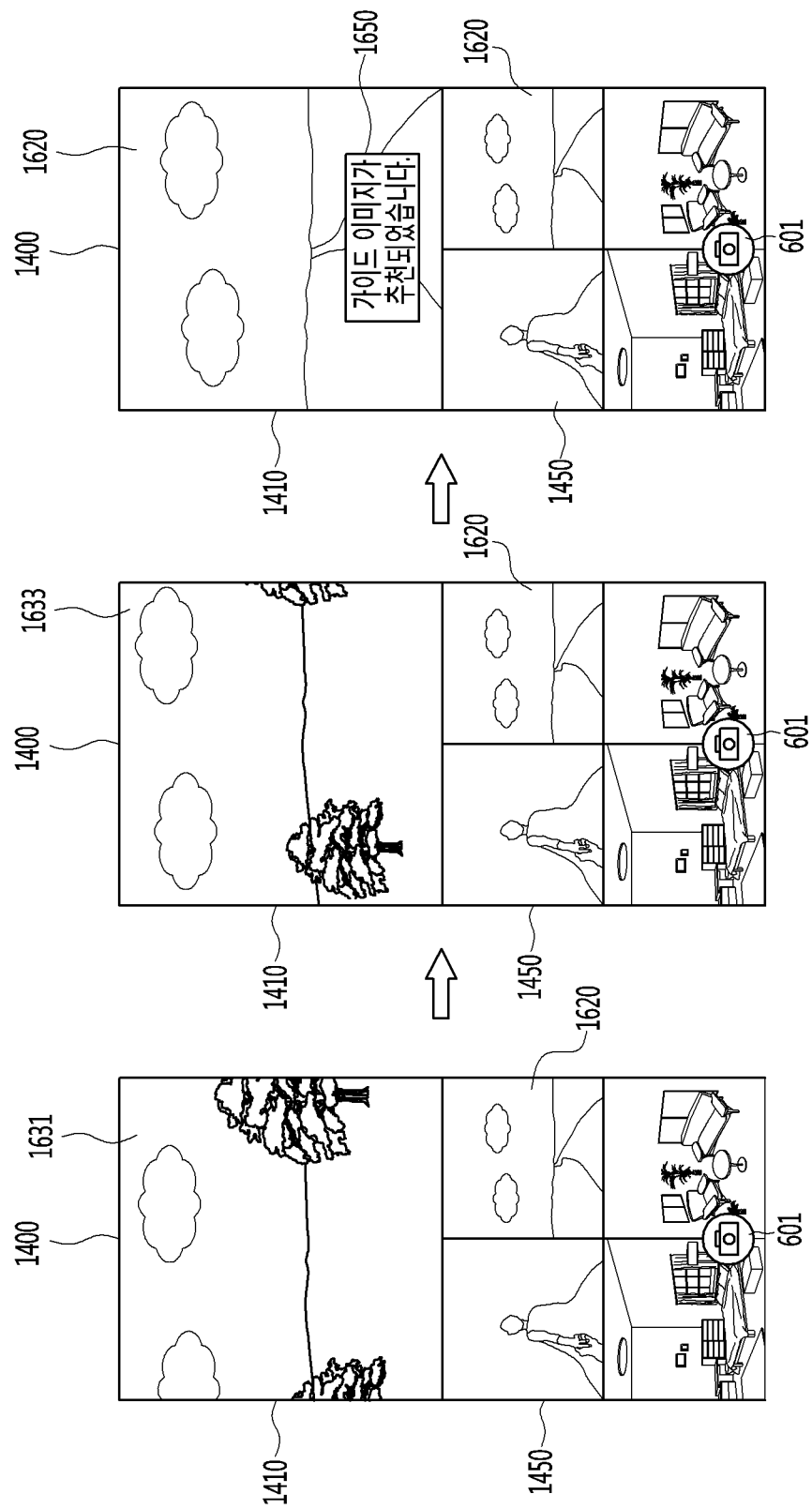

FIG. 16a is a diagram illustrating a process of taking a picture through a guide overlapping screen according to an embodiment of the present invention, and FIGS. 16b and 16c are diagrams illustrating an example of recommending a guide object based on a preview picture according to an embodiment of the present invention.

Referring to FIG. 16a, the guide overlapping screen 1400 displays a first guide object 1411 corresponding to a first sample project 1451.

The controller 180 may change the first guide object 1411 to a second guide object 1413 when a second sample project 1453 is selected.

The controller 180 may take a preview picture and display the taken image 1600 when the camera button 1463 is selected. The controller 180 may display a project selection icon 1471 when the taken image 1600 is selected.

When the project icon 1471 is selected, the controller 180 may change the image 1600 to the project view screen 1450 again.

On the project view screen 1450, the order of the first sample project 1451 and the second sample project 1453 may be changed. That is, the last used sample project may be located at the left upper end of the project view screen 1450.

Meanwhile, guide text <Please take a picture according to a guide photo> may be initially displayed and disappear upon taking a picture.

Meanwhile, according to another embodiment of the present invention, the artificial intelligence unit 130 of the mobile terminal 100 may recommend a guide object according to the shape of a subject included in the preview picture.

The artificial intelligence unit 130 is equal to the component described with reference to FIG. 1a. The artificial intelligence unit 130 may be configured independently of the controller 180 or may be included in the controller 180.

Referring to FIG. 16b, the preview picture 1610 acquired through the camera 121 is displayed on the preview screen 1410 of the guide overlapping screen 1400.

In addition, pre-stored guide images may be displayed on the project view screen 1450. The guide images may correspond to a plurality of sample projects.

The artificial intelligence unit 130 may extract the shape of the subject included in the preview picture 1610 and recommend a guide image based on the shape of the extracted subject.

For example, the artificial intelligence unit 130 may extract the shape of a railroad 1611 and the shape of the horizon 1613 included in the preview picture 1610. The artificial intelligence unit 130 may select a guide image 1620, the shape of which matches the extracted shapes of the railroad 1611 and the horizon 1613 by the reference value or more.

Here, the reference value may be different from the reference value used to automatically take the picture described in step S507 of FIG. 5.

The artificial intelligence unit 130 may display the selected guide image 1620 on the preview screen 1610. The guide image 1620 may be displayed to overlap the preview picture 1610.

The automatically recommended guide image 1620 may be used to guide the user to take the preview picture 1610.

Thereafter, the controller 180 may perform step S505 of FIG. 5 and subsequent steps thereof or step S706 of FIG. 7 and subsequent steps thereof.

The artificial intelligence unit 130 may change the recommended guide object according to the shape of the subject included in the preview picture 1610.

Next, FIG. 16c will be described.

While FIG. 16b shows an embodiment of recommending a guide object in a state of fixing a preview picture, FIG. 16b shows an embodiment of recommending a guide object in a state of changing a preview picture.

Referring to FIG. 16c, a first preview picture 1631 acquired through the camera 121 is displayed on the preview screen 1410.

The artificial intelligence unit 130 may extract a first shape of a subject included in the first preview picture 1631.

Thereafter, a second preview picture 1633 acquired through the camera 121 according to movement of the mobile terminal 100 may be displayed on the preview screen 1410.

The artificial intelligence unit 130 may extract a second shape of a subject included in the second preview picture 1633.

The artificial intelligence unit 130 may combine the first shape of the subject extracted from the first preview picture 1613 and the second shape of the subject subtracted from the second preview picture 1633 and recommend a guide image 1620.

The artificial intelligence unit 130 may combine the first shape of the subject and the second shape of the subject, extract a final shape and acquire the guide image 1620 matching the extracted shape by the reference value or more.

The acquired guide image 1620 and a dialog box 1650 indicating that the guide image 1620 has been recommended may be displayed on the preview screen 1410.

The recommended guide image 1620 and the dialog box 1650 may be displayed to overlap the preview picture currently acquired through the camera 121.

A plurality of guide images may be recommended.

The controller 180 may display another guide image on the preview screen 1410 in response to reception of flicking input for the guide image 1620.

The user may check a guide image suitable for the structure of the preview picture while sequentially moving the recommended guide images on the preview screen 1400.

Next, FIG. 17 will be described.

Figure 17:
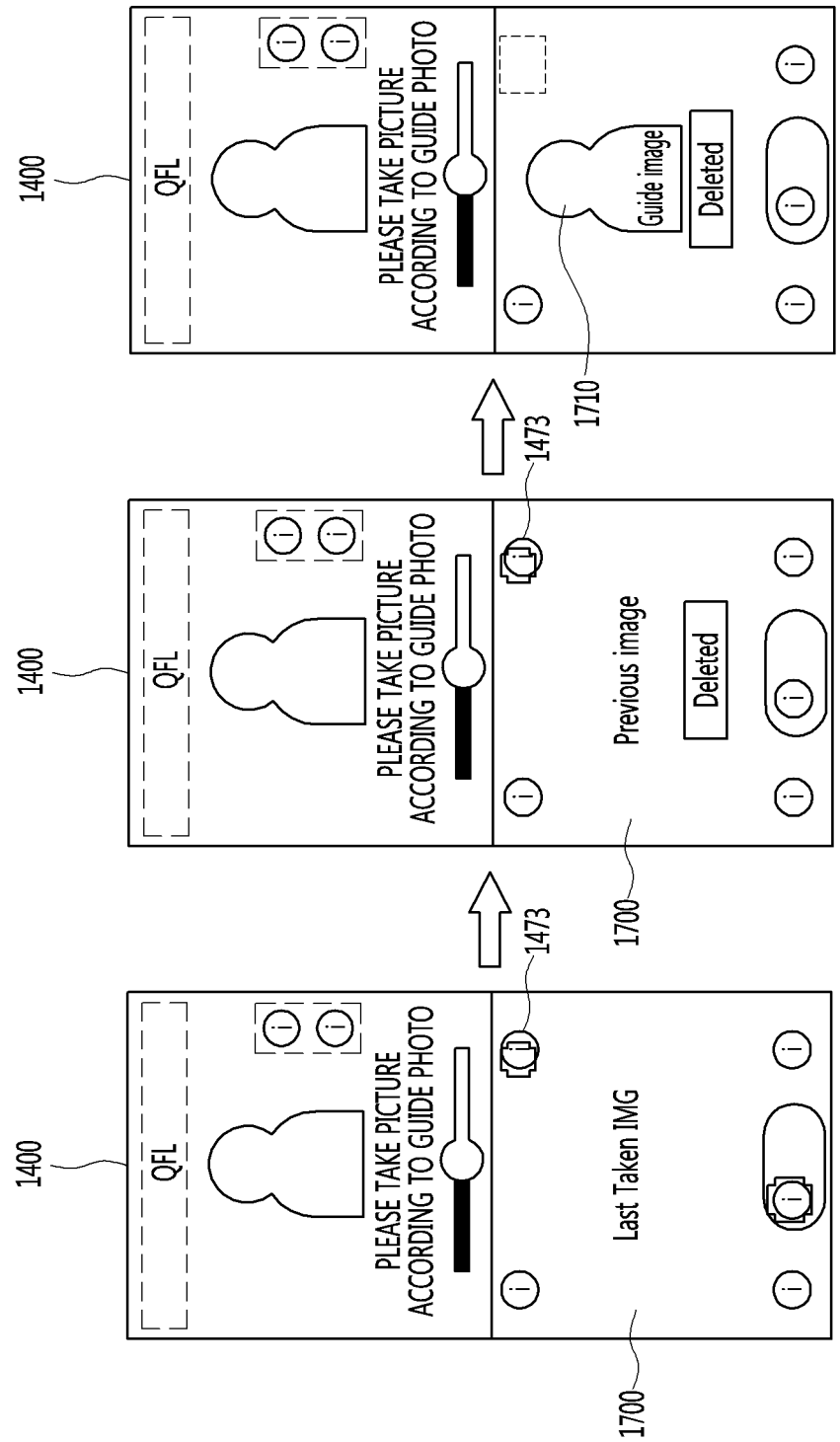
FIG. 17 is a diagram illustrating a process of deleting a taken image from a guide overlapping screen.

FIG. 17 is a diagram illustrating a process of deleting a taken image from a guide overlapping screen.

Referring to FIG. 17, when a deletion icon is selected on a guide overlapping screen 1700, the controller 180 may delete the taken image 1700.

The image may be deleted from a gallery application.

If there is no image taken through a first sample project 1451, a guide photo 1710 corresponding to the first sample project 1451 may be displayed.

The guide photo 1711 may be another photo which is equal to the guide object 1411 or another photo which replaces the guide object 1413.

Next, FIG. 18 will be described.

Figure 18:
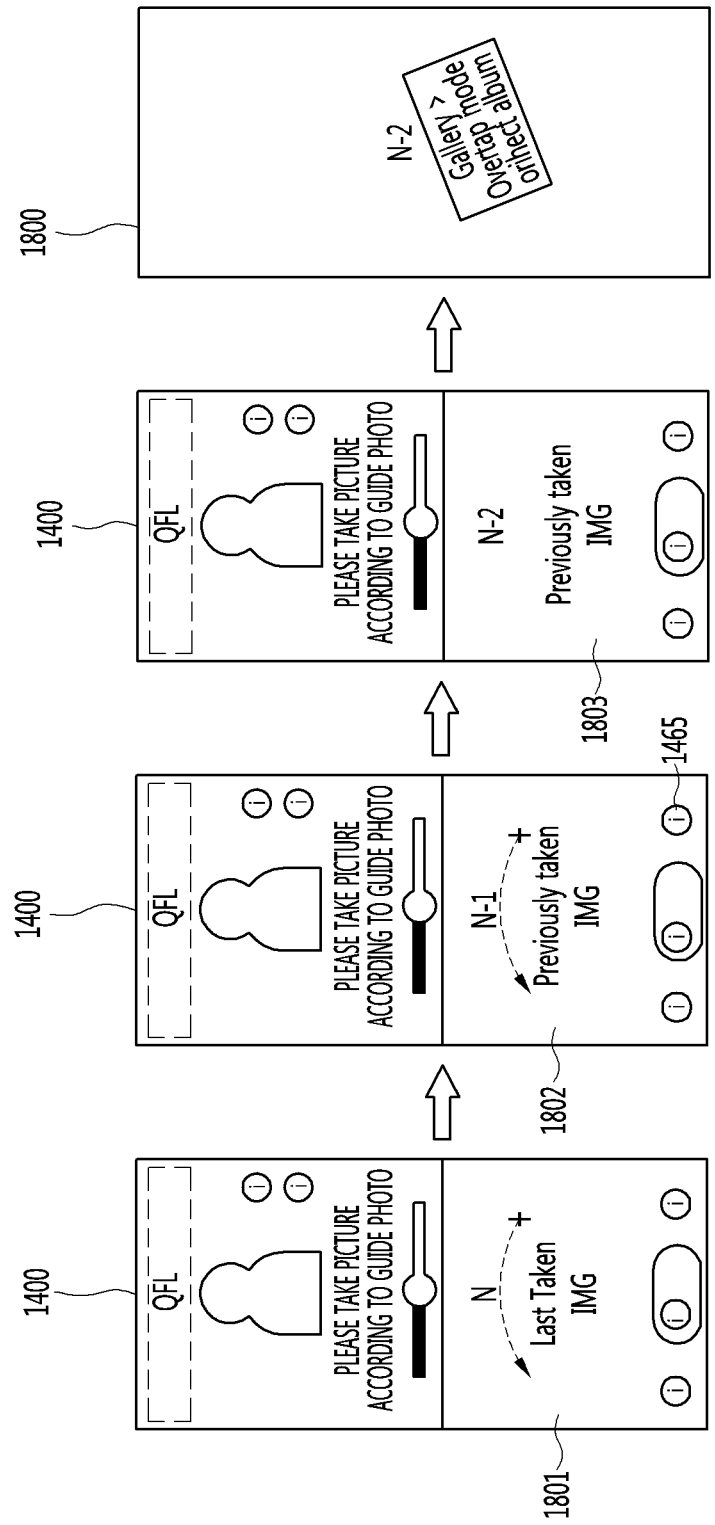
FIG. 18 is a diagram illustrating an example of providing images corresponding to a selected sample project.

FIG. 18 is a diagram illustrating an example of providing images corresponding to a selected sample project.

Referring to FIG. 18, a guide overlapping screen 1400 may sequentially provide images taken through a first sample project 1451.

The controller 180 may change a first image 1801 to a second image 1803 in response to flicking input. Similarly, the controller 180 may change the second image 1803 to a third image 1803 in response to flicking input.

The controller 180 may display an album of the images taken through the first sample project 1451 when a gallery thumbnail icon 1465 is selected.

Figure 19:
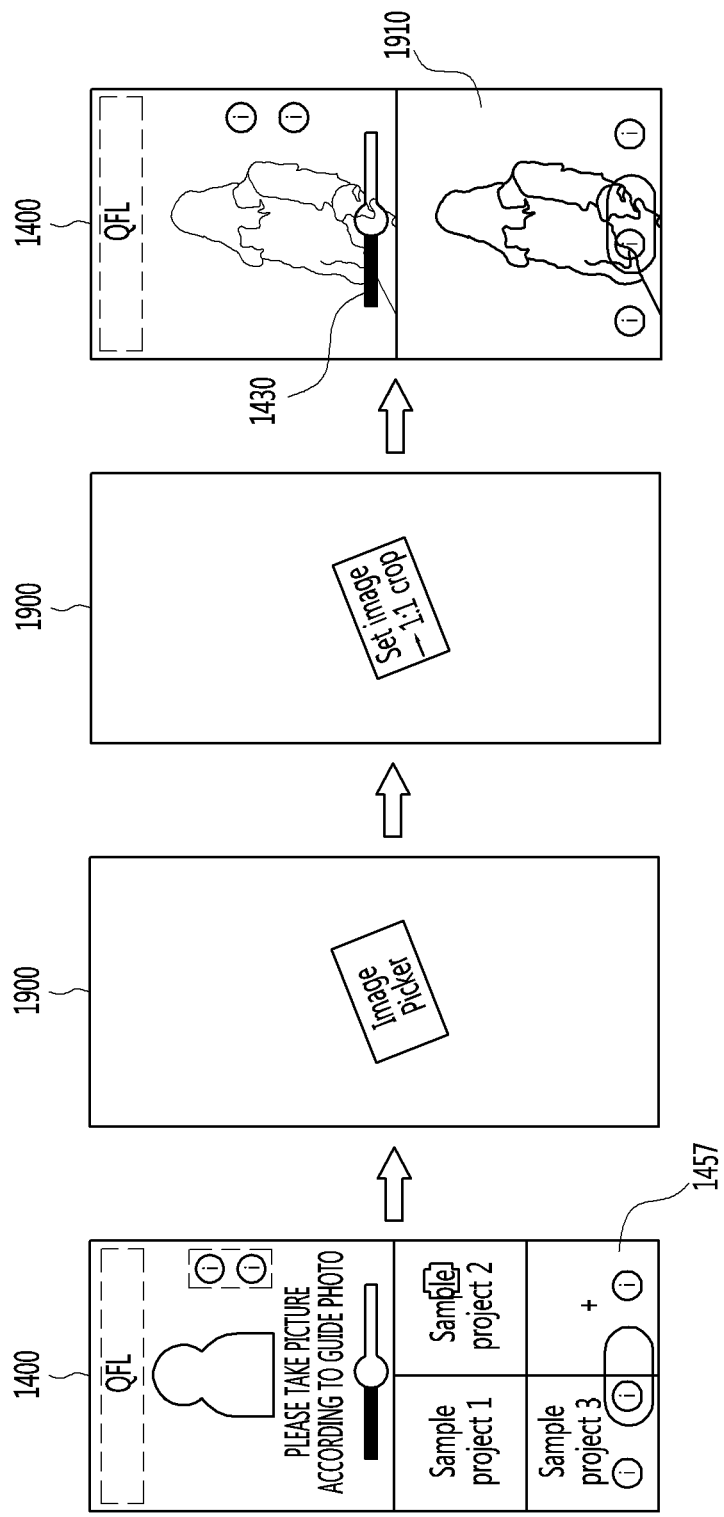
FIG. 19 is a diagram illustrating an example of adding a project through an addition project.

FIG. 19 is a diagram illustrating an example of adding a project through an addition project.

When an addition project 1457 included in the guide overlapping screen 1400 is selected, the controller 180 may display a screen 1900 including sample images for adding a project.

When a sample image 1910 is selected on the screen 1900 and the size of the sample image 1910 is adjusted to 1:1, the controller 180 may move a new project corresponding to the sample image 1910 to the position of a first sample project 1451. Existing sample projects may be shifted one by one in original storage order.

If the preview screen 1410 and the project view screen 1450 of FIG. 14 have the same size, this size may be referred to as 1:1. However, 1:1 is merely exemplary.

Figure 20:
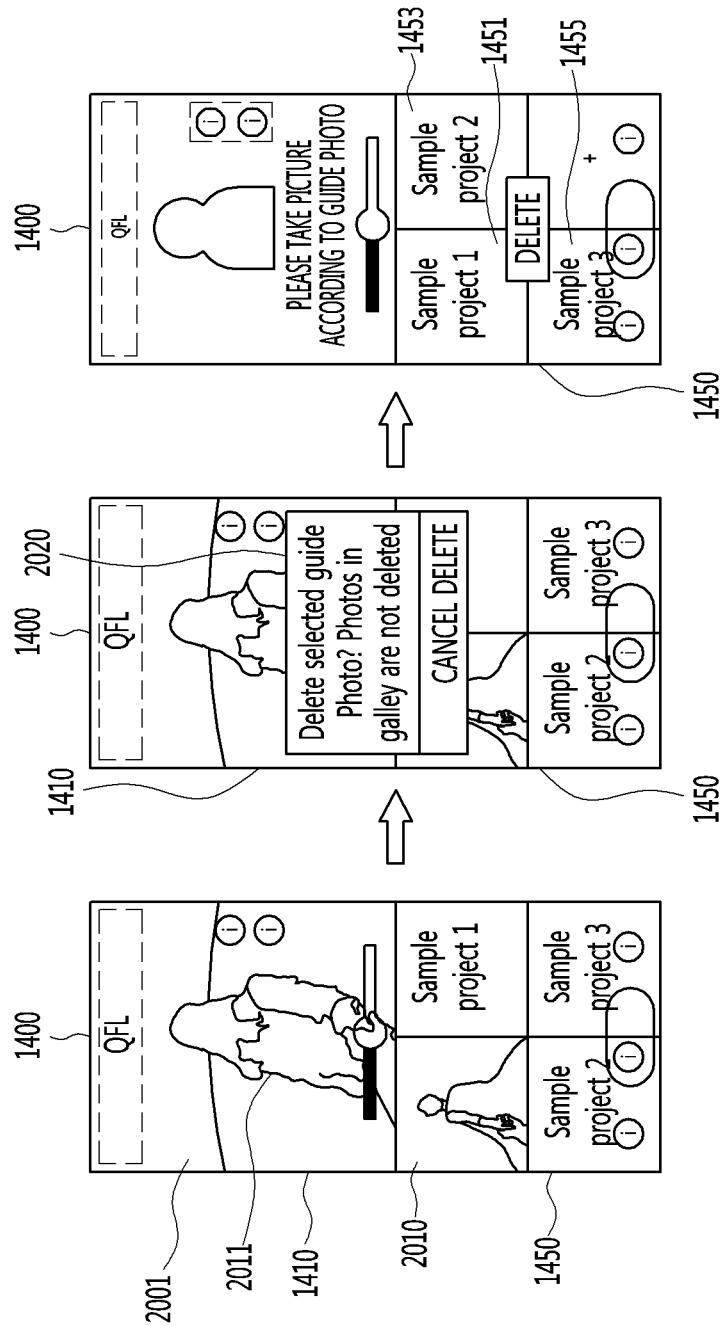
FIG. 20 is a diagram illustrating a process of deleting a project added through an addition project by a user.

FIG. 20 is a diagram illustrating a process of deleting a project added through an addition project by a user.

A project 2010 added by the user is displayed on the guide overlapping screen 1400. In addition, a guide object 2011 corresponding to the project 2010 and a preview picture 2001 are displayed on the preview screen 1410.

The controller 180 may display a deletion dialog box 2020 for prompting the user about deletion of the project 2010 when the project 2010 is selected for a predetermined time.

The project 2010 may be deleted through user input. However, in this case, images corresponding to the project 2010 and stored in the gallery application may not be deleted.

If the project 201 is deleted, the first, second and third sample projects 1451, 1453 and 1455 may sequentially appear on the project view screen 1450.

The first, second and third sample projects 1451, 1453 and 1455 may not be deleted according to long press input of the user.

Figure 21:
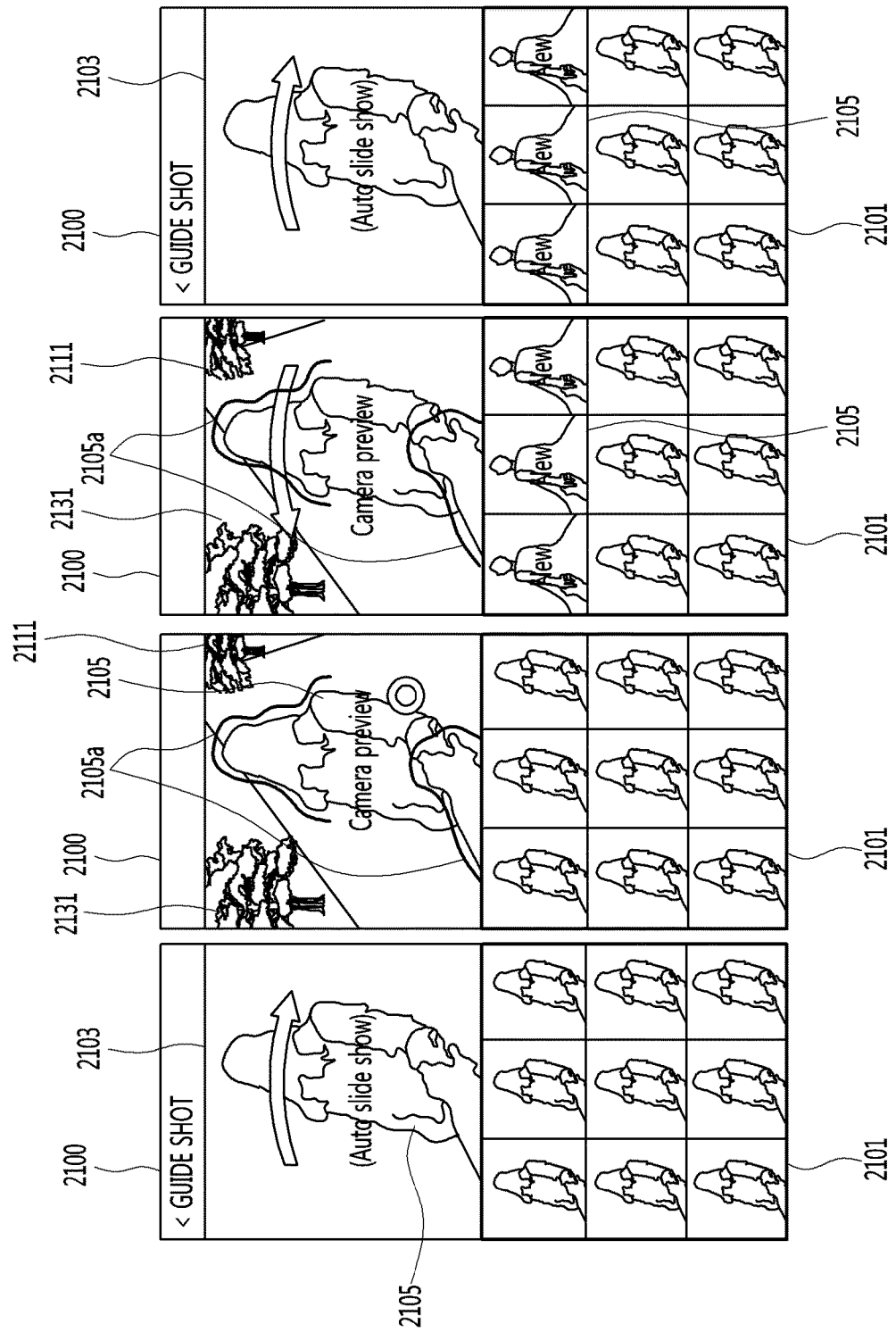
FIG. 21 is a diagram illustrating a process of entering a guide overlapping screen on a gallery screen according to an embodiment of the present invention.

FIG. 21 is a diagram illustrating a process of entering a guide overlapping screen on a gallery screen according to an embodiment of the present invention.

Referring to FIG. 21, a gallery guide screen 2100 according to execution of a gallery application is shown.

The gallery guide screen 2100 may include a thumbnail view screen 2010 and a guide shot screen 2103.

The thumbnail view screen 2101 may include guide thumbnail images provided by a sample object selected from among a plurality of sample objects.

The guide shot screen 2103 may display a guide thumbnail image 2105 selected from among the guide thumbnail images.

The controller 180 may change the guide shot screen 2103 to the preview screen 2111 if input of flicking the guide shot screen 2103 to the right is received.

That is, the controller 180 may turn the camera 121 on in response to flicking input.

Therefore, a guide thumbnail image 2015 and a preview picture 2131 acquired through the camera 121 may be displayed on the preview screen 2111.

At this same time, the controller 180 may further display a guide line 2105a for identifying the shape of the guide thumbnail image 2015.

The controller 180 may take a preview picture 2131 in response to touch input of selecting the preview screen 2111.

Images 2150 corresponding to the taken preview picture 2131 may be displayed on the thumbnail view screen 2101.

The controller 180 may change the preview screen 2111 to the guide shot screen 2103 as input of flicking the preview screen 2111 to the left is received. The camera 121 may be turned off.

The user may rapidly take a picture of a subject using the guide thumbnail image in a state of executing a gallery application.

According to another embodiment of the present invention, the user may share the guide object with friends to perform guided picture-taking.

Figure 22:
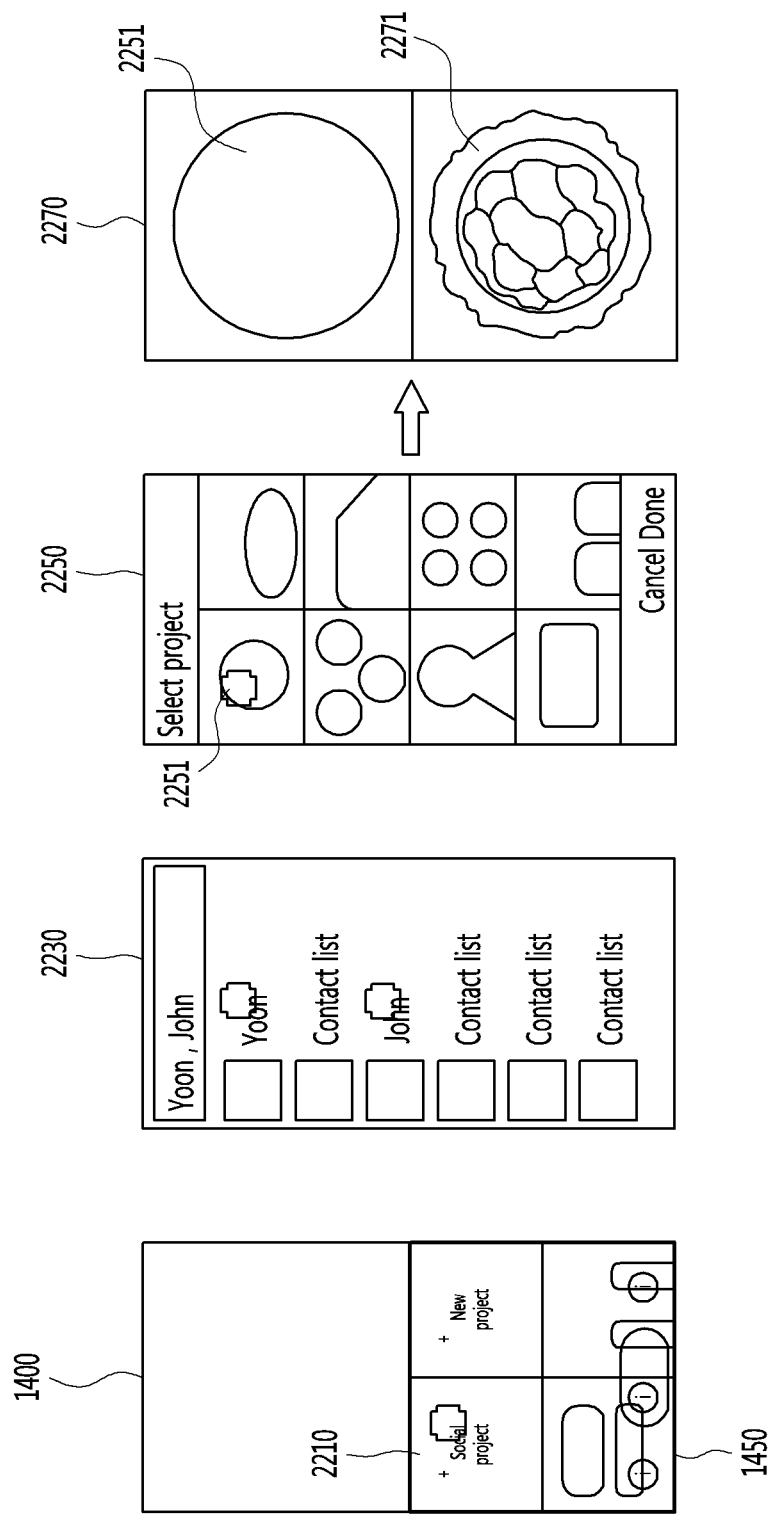
FIG. 22 is a diagram illustrating a process of sharing a guide object using a social network service according to an embodiment of the present invention.

FIG. 22 is a diagram illustrating a process of sharing a guide object using a social network service according to an embodiment of the present invention.

Referring to FIG. 22, a social project 2210 may be further displayed on the project view screen 1450 of the guide overlapping screen 1400.

The social project 2210 may be a project for sharing taken photos with friends of the user using the guide object through a social network service.

The controller 180 may display a friend list 2230 for selecting friends, with whom photos will be shared, when the social project 2210 is selected.

The controller 180 may display a sample object list 2250 for selecting a sample object. The sample object may have the same concept as the guide object.

When a guide object 2251 included in the sample object list 2250 is selected, the controller 180 may display the selected guide object 2251 and a photo 2271 taken through the selected guide object 2251.

The name of the friend selected from the friend list 2230 may be displayed on the taken photo 2271.

Figure 23A:
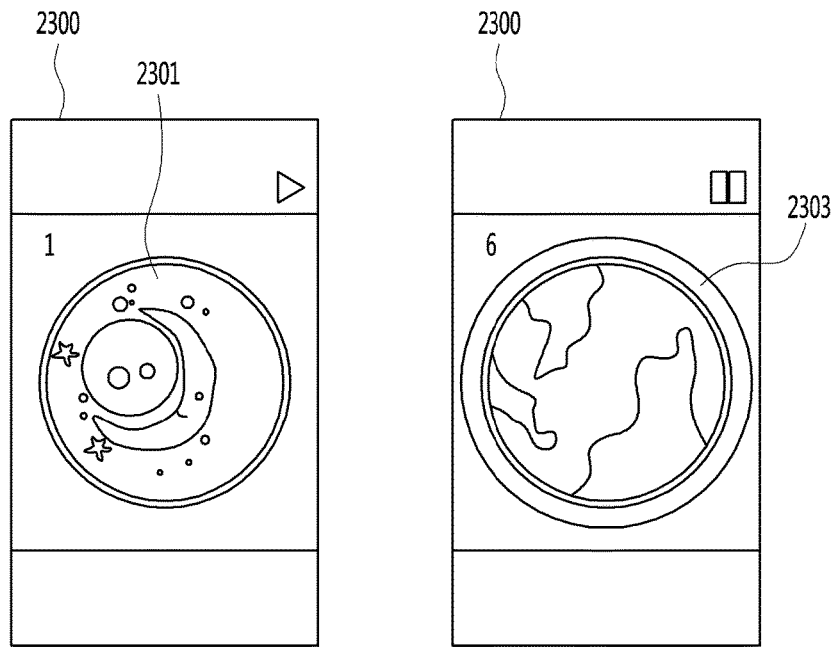
FIGS. 23a and 23b are diagrams illustrating an example of reproducing photos using the same or similar guide object according to an embodiment of the present invention.
Figure 23B:
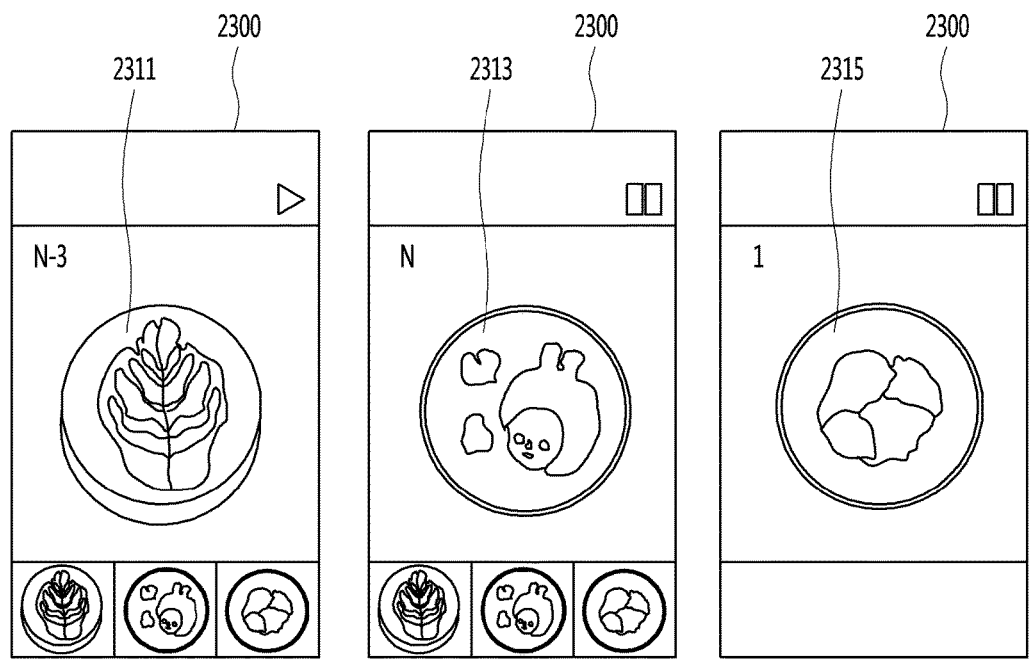

FIGS. 23a and 23b are diagrams illustrating an example of reproducing taken photos using the same or similar guide object according to an embodiment of the present invention.

Referring to FIG. 23a, a gallery reproduction screen 2300 shows a process of reproducing taken images 2301 and 2303 with passage of time using a first guide object.

The first guide object may be an object having the shape of a coffee cup.

The controller 180 may reproduce the taken images 2301 and 2303 in the form of a slideshow using the first guide object.

When the taken images are all reproduced using the first guide object, the controller 180 may reproduce taken images 2311, 2313 and 2315 using a second guide object having a shape similar to that of the first guide object, as shown in FIG. 23.

If the first guide object has a circular shape, the second guide object may have a circular shape.

According to another embodiment of the present invention, if the preview picture and the guide image are similar in terms of tone, various effects may be applied to easily identify the guide image.

In one embodiment, the controller 180 may increase transparency of the guide image and increase the thickness or color of the outline of the guide image, if the brightness of the preview picture and the guide image is equal to or less than predetermined brightness.

In another embodiment, the controller 180 may change the guide image to a black/white image to clearly define the guide image, if the brightness of the preview picture and the guide image is equal to or less than predetermined brightness.

In another embodiment, the controller 180 may increase the contrast of the guide image to improve visibility of the guide image, if the brightness of the preview picture and the guide image is equal to or less than predetermined brightness.

Figure 24A:
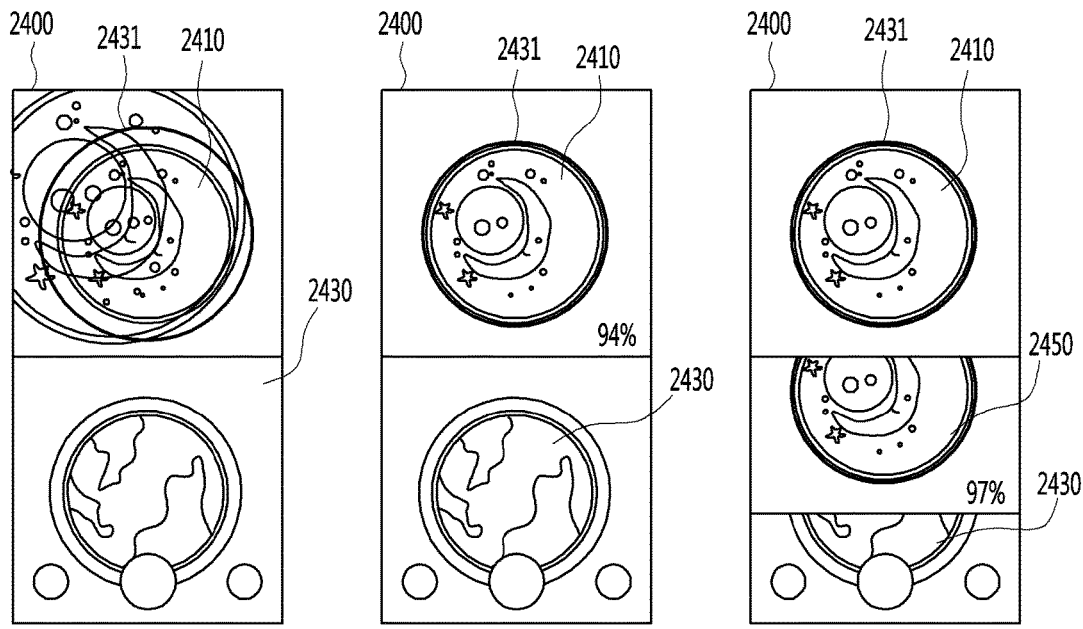
FIGS. 24a and 24b are diagrams illustrating a scenario of taking a picture of a subject using a guide object according to an embodiment of the present invention.
Figure 24B:
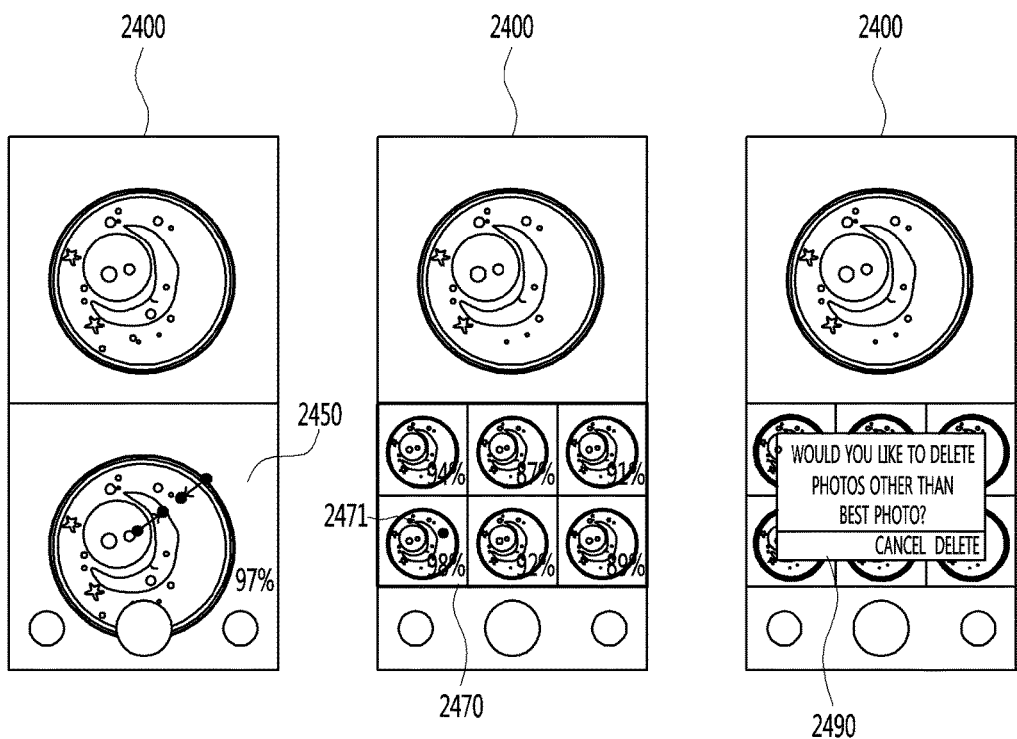

FIGS. 24a and 24b are diagrams illustrating a scenario of taking a picture of a subject using a guide object according to an embodiment of the present invention.

Referring to FIG. 24a, a guide overlapping screen 2400 is shown.

The guide overlapping screen 2400 may include a picture 2410 of a subject acquired through the camera 121 and a guide image 2430.

The guide image 2430 may be displayed to overlap the picture 2410 of the subject.

In addition, the guide line 2431 indicating the outline of the guide image 2430 may also be displayed.

The controller 180 may transparently display the guide image 2430 as proximity between the guide image 2430 and the picture 2410 of the subject increases.

In addition, the controller 180 may display proximity between the guide image 2430 and the picture 2410 of the subject as a numerical value. Therefore, the user may check proximity between the guide image 2430 and the picture 2410 of the subject in real time in a process of taking a picture.

The controller 180 may automatically take the picture 2410 of the subject if proximity between the guide image 2430 and the picture 2410 of the subject is equal to or greater than reference proximity. The reference proximity may be 90%, which is merely exemplary.

The controller 180 may change the guide image 2430 to the automatically taken image 2450 of the subject. In the image 2450 of the subject, proximity between the guide image 2430 and the image 2450 of the subject is displayed as a numerical value. Therefore, the user may easily check proximity of the taken image 2450 of the subject to the guide image 2430.

FIG. 24b will be described on the assumption that the process of FIG. 24a is repeated to take several images of the subject.

The controller 180 may receive pinch-in input for the image 2450 of the subject and display an image list 2470 including a plurality of images taken in the same situation according to the received pinch-in input.

An image 2471 having highest proximity with the guide object among the plurality of images included in the image list 2470 may be displayed to be distinguished from the other images.

The controller 180 may display a dialog box 2490 for deleting images except for the image 2471 having highest proximity when the image 2417 is selected for a predetermined time or more.

The user may delete the images having low proximity through the dialog box 2490.

Meanwhile, the controller 180 may enlarge the image 2450 of the subject as pinch-out input for the image 2450 of the subject is received.

Figure 25:
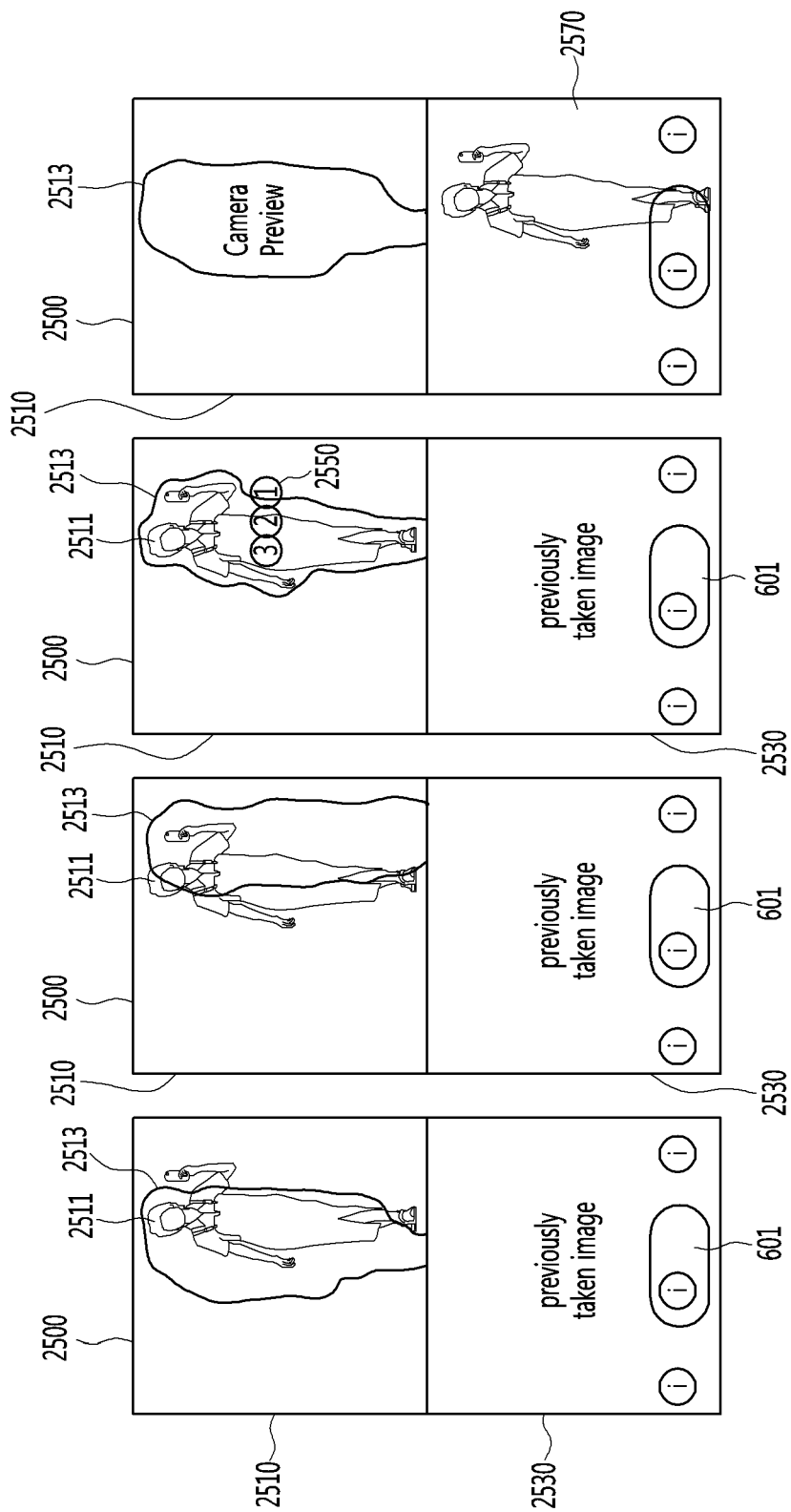
FIG. 25 is a diagram illustrating a process of capturing a preview picture by a user using a guide object according to an embodiment of the present invention.

FIG. 25 is a diagram illustrating a process of taking a preview picture by a user using a guide object according to an embodiment of the present invention.

In particular, in FIG. 25, assume that it is difficult for the user to take a picture while directly viewing a preview picture.

Referring to FIG. 25, the guide overlapping screen 2500 may include a preview screen 2510 and a previously taken image 2530 located below the preview screen 2510.

On the preview screen 2510, the picture 2511 of a subject acquired by the camera 121 and a guide line 2513 are displayed.

When the position of the camera 121 of the mobile terminal 100 is changed or the subject is moved, the line of the picture 2511 of the subject may partially match the guide line 2513.

The controller 180 may change the color of the guide line 2513 if the line of the picture 2511 of the subject partially matches the guide line 2513 by a reference ratio or more.

As another example, the controller 180 may output an alarm indicating that a picture is automatically taken, if the line of the picture 2511 of the subject partially matches the guide line 2513 by the reference ratio or more.

The controller 180 may output an alarm indicating that a picture is automatically taken while changing the color of the guide line 2513, if the line of the picture 2511 of the subject partially matches the guide line 2513 by the reference ratio or more.

When the picture 2511 of the subject is automatically taken, the controller 180 may display a timer indicator 2550 indicating that the picture is taken on the preview screen 2510, after a predetermined time.

Of course, the controller 180 may take the picture 2511 of the subject in response to input for selecting the camera button 601.

The taken image 2570 may be provided below the preview screen 2510.

Even when it is difficult for the user to take the picture while directly viewing the preview screen, it is possible to easily take the picture of the subject suitable for the guide line.

Next, a floating action button will be described. The floating action button may be displayed on an application execution screen in order to rapidly use an application.

For example, the floating action button may have an addition button for adding an alarm upon executing an alarm application. The property or shape of the floating action button may be changed according to application types.

Figure 26A:
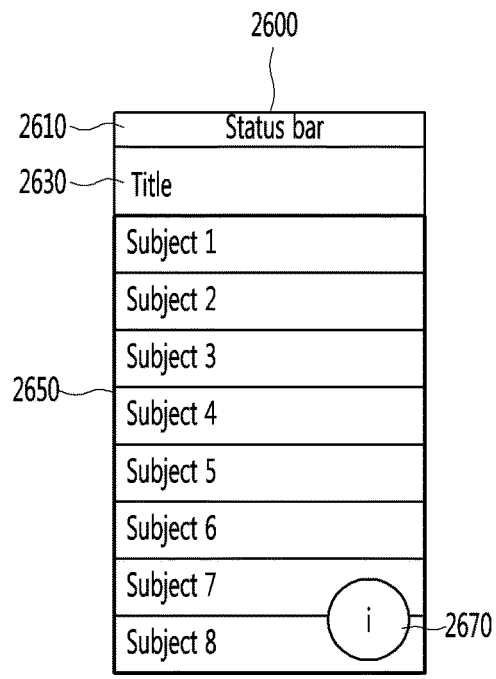
FIGS. 26a and 26b are diagrams illustrating arrangement of a floating action button according to an embodiment of the present invention.
Figure 26B:
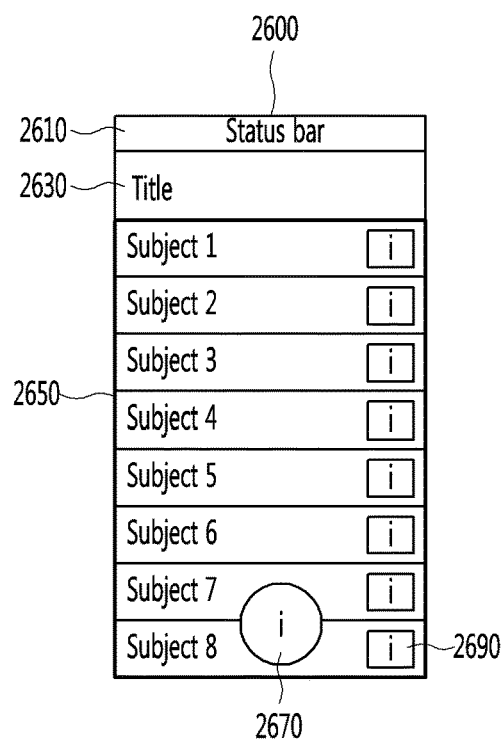

FIGS. 26a and 26b are diagrams illustrating arrangement of a floating action button according to an embodiment of the present invention.

Referring to FIGS. 26a and 26b, the mobile terminal 100 displays an application execution screen 2600.

The application execution screen 2600 may include a status bar 2610, a title item 2630 and a subject list 2650.

The status bar 2610 may provide the status information of the mobile terminal 100. The status information of the mobile terminal 100 may include at least one of a network connection state, a battery state, a current time and a received notice of the mobile terminal 100.

The title item 2630 may include the name of the application.

The subject list 2650 may include content provided by the application. For example, if the application is a contact application for providing the contact information of other persons, the subjects included in the subject list 2650 may include the contact information of the other persons.

On the application execution screen 2600, a floating action button 2670 may be displayed. The floating action button 2670 may be located at the right lower end of the application execution screen 2600.

If an icon 2690 for inputting a command is displayed at one side of each subject included in the subject list 2650, the position of the floating action button 2670 may be changed to the center of the lower end of the screen.

The floating action button 2670 may not be displayed to overlap an overflow menu or another menu which may be provided by the application execution screen 2600.

The floating action button 2670 may not overlap a dialog box disappearing after being displayed for a predetermined time.

The gallery icon 1465 described with reference to FIGS. 14a and 14b may be an example of the floating action button 2670.

Next a scenario according to selection of the floating action button 2670 will be described.

Figure 27A:
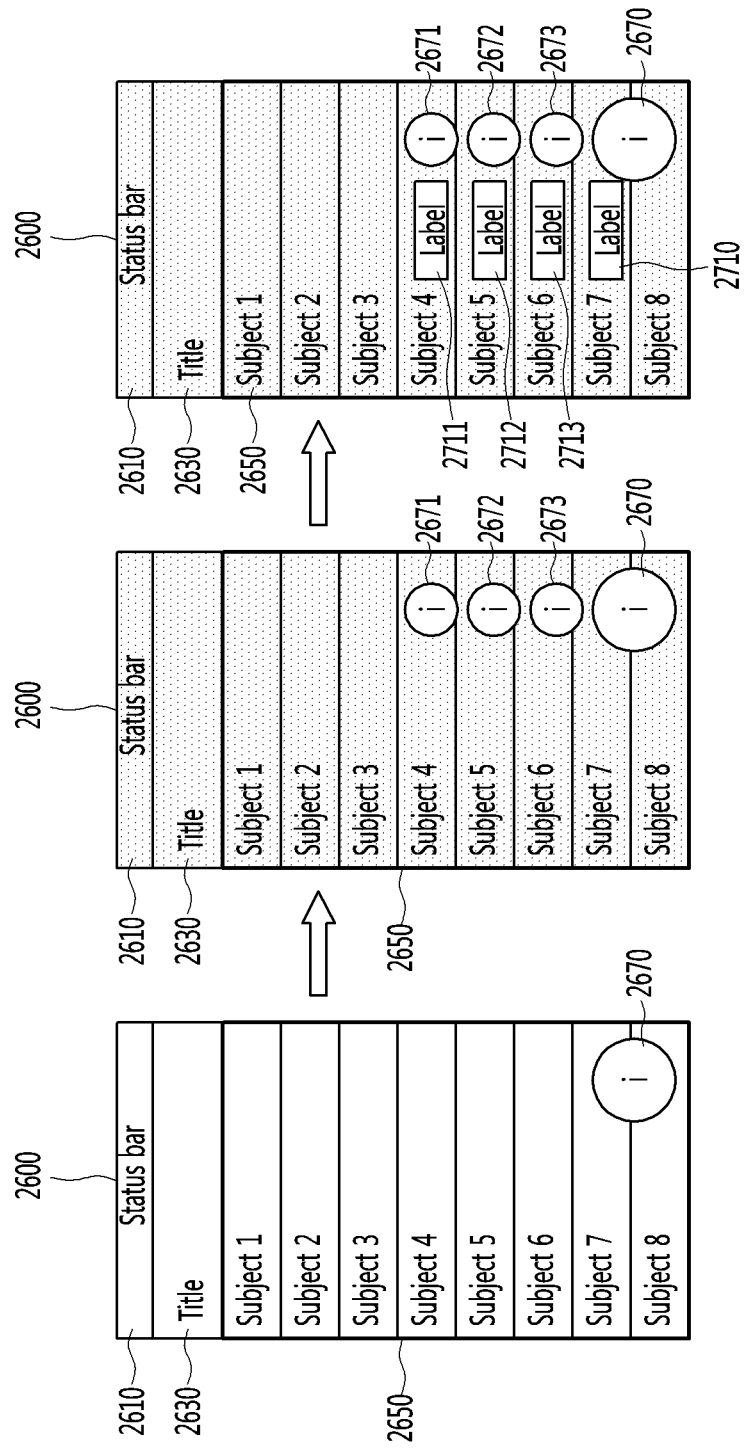

FIG. 27a is a diagram showing operation according to selection of a floating action button in a state in which a mobile terminal is arranged in a portrait mode and FIG. 27b is a diagram showing operation according to selection of a floating action button in a state in which a mobile terminal is arranged in landscape mode.

Referring to FIG. 27a, when the floating action button 2670 is selected twice within 1 second or is selected for a predetermined time in portrait mode, the controller 180 may further display sub-floating action buttons 2671, 2672 and 2673. At this same time, the controller 180 may dim the region other than the region in which the floating action button 2670 and the sub-floating action buttons 2671, 2672 and 2673 are displayed. When the other region is selected, the controller 180 may make the sub-floating action buttons 2671, 2672 and 2673 disappear.

Each of the sub-floating action buttons 2671, 2672 and 2673 may perform the sub function related to the function of the floating action button 2670.

The sub-floating action buttons 2671, 2672 and 2673 may be arranged according to operation priority. For example, a button arranged at a lowermost end of the sub-floating action buttons 2671, 2672 and 2673 may have highest priority.

A label 2710 describing the function of the floating action button 2670 and labels 2711, 2712 and 2713 describing the respective functions of the sub-floating action buttons 2671, 2672 and 2673 may be displayed at one side of the floating action button 2670.

In FIG. 27b, the controller 180 may further display the sub-floating action buttons 2671, 2672 and 2673 in addition to the floating action button 2670 in the landscape mode. Similarly, the label 2710 describing the function of the floating action button 2670 and the labels 2711, 2712 and 2713 describing the respective functions of the sub-floating action buttons 2671, 2672 and 2673 may be displayed at one side of the floating action button 2670.

If the number of sub-floating action buttons exceeds 4 in the landscape mode, the label of the floating action button 2670 and the labels of the sub-floating action buttons 2671, 2672, 2673, 2674 and 2675 may not be displayed.

The user may rapidly and easily use the application through the floating action button and the sub-floating action buttons.

Next, a floating navigation button will be described. The floating navigation button may refer to a button for returning to a previous screen or displaying a home screen.

Figure 29:
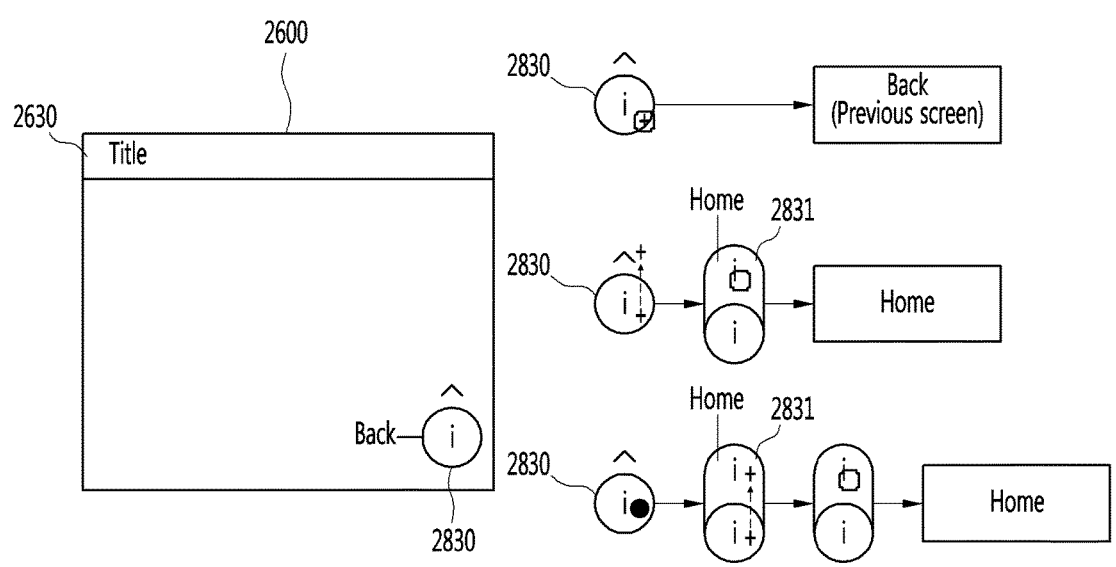
FIG. 29 is a diagram illustrating a scenario of using a floating navigation button.

FIG. 28 is a diagram illustrating a state in which a floating navigation button is displayed according to an embodiment of the present invention, and FIG. 29 is a diagram illustrating a scenario of using a floating navigation button.

Referring to FIG. 28, an application execution screen 2600 is displayed in portrait mode.

On the application execution screen 2600, a status bar 2610, a title item 2630 and a navigation bar 2810 may be displayed.

The status bar 2610 and the title item 2630 were described with reference FIG. 26a.

The navigation bar 2810 may include a back button, a home button for returning to a home screen and a recent execution button for providing a last executed screen.

Meanwhile, the status bar 2610 may not be displayed on the application execution screen 2600.

If the portrait mode is changed to the landscape mode according to rotation of the mobile terminal 100, the controller 180 may make the status bar 2610 and the navigation bar 2810 disappear. At the same time, the controller 180 may display the floating navigation button 2840 in the landscape mode.

The user be immersed in use of the application as the status bar 2610 and the navigation bar 2810 disappear. The mode in which the floating navigation button 2830 is displayed in the landscape mode may be referred to as an immersive mode because sense of immersion is given to the user.

The floating navigation button 2830 may be a button for returning to a previous screen.

The back button 1461 described with reference to FIGS. 14a and 14b may be an example of the floating navigation button 2830.

FIG. 29 will be described.

When the floating navigation button 2830 is selected, the controller 180 may change the application execution screen 2600 to the previous screen.

The controller 180 may change the application execution screen 2600 to the home screen as drag input of moving the floating navigation button 2830 upward is received.

As another example, the controller 180 may display the home button 2831 above the floating navigation button 2830 as drag input of moving the floating navigation button 2830 upward is received. Thereafter, the controller 180 may change the application execution screen 2600 to the home screen as input of selecting the home button 2831 is received.

As another example, the controller 180 may display the home button 2831 above the floating navigation button 2830 when the floating navigation button 2830 is selected for a predetermined time or more. Thereafter, the controller 180 may change the application execution screen 2600 to the home screen as input of selecting the home button 2831 is received.

Therefore, the user may experience fast screen change through the floating navigation button 2830 without a conventional navigation bar.

Meanwhile, the position of the floating navigation button 2830 may be changed. That is, the position of the floating navigation button may be moved so as not to overlap another menu or a dialog box.

The floating navigation button 2830 may be displayed along with the floating action button 2670 described with reference to FIGS. 26a and 26b.

The movable regions of the floating action button 2670 and the floating navigation button 2830 may be set according to user setting input.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
   a memory;
   a camera configured to acquire a preview picture including a picture of a subject;
   a display unit configured to display the preview picture; and
   a controller configured to control the display unit and the camera,
   wherein the controller is further configured to:

display a guide object to provide guidance on taking the picture of the subject, and automatically, take the preview picture if a shape of the subject matches a shape of the guide object by at least one reference value, wherein a whole image acquired by taking the preview picture includes a preview image corresponding to the preview picture and an additional image corresponding to an additional picture capable of being taken by the camera, the controller is further configured to:

store the whole image in the memory, move a position of the stored whole image so that a position of the picture of the subject corresponds to a position of the guide object, and display a final image according to a moving result.

2. The mobile terminal according to claim 1, wherein the controller is configured to, automatically, take the preview picture if a shape of an outline of the subject matches a shape of an outline of the guide object by the at least one reference value.

3. The mobile terminal according to claim 2, wherein the controller is configured to display a message indicating that the display unit is moved in one or more of upper, lower, left and right directions to take a picture if the shape of the outline of the subject does not match the shape of the outline of the guide object by the reference value or more.

4. The mobile terminal according to claim 1, wherein the controller is configured to display a plurality of photos, to extract guide lines from two or more of the plurality of photos, and to generate a common guide line of the extracted guide lines as the guide object.

5. The mobile terminal according to claim 4, wherein the controller is configured to dim a photo, which does not include the common guide line of the generated guide object, among the plurality of photos.

6. The mobile terminal according to claim 1, wherein the controller is configured to display a preview screen including the preview picture and the guide object and a project view screen for providing the guide object, wherein a ratio of the preview screen to the project view screen is 1:1, and wherein the guide object is any one of a/the guide line, a guide region and a guide image.

7. The mobile terminal according to claim 1, wherein the controller is configured to acquire the guide object based on the shape of the subject included in the preview picture and to display the acquired guide object to overlap the preview picture.

8. The mobile terminal according to claim 1, wherein the controller is configured to display an alarm or timer indicator indicating that the preview picture is automatically taken if the shape of the subject matches the shape of the guide object by the reference value or more.

9. The mobile terminal according to claim 1, wherein the controller is further configured to:

automatically, take the preview picture if the shape of the subject matches the shape of the guide object by at least one reference value and a ratio of a size of the subject to a size of the guide object is equal to or greater than a reference ratio, and adjust the size of an image of the subject acquired by taking the preview picture to correspond to the size of the guide object and display a generated final image.

10. The mobile terminal according to claim 9, wherein the controller is configured to store the preview image and the generated final image in the memory.

11. The mobile terminal according to claim 9, wherein the controller is configured to output one or more of a message or alarm indicating that the preview picture is automatically taken if the ratio of the size of the subject to the size of the guide object is equal to or greater than the reference ratio and to display a message indicating the preview picture is enlarged or reduced and taken if the ratio is less than the reference ratio.

12. The mobile terminal according to of claim 9, wherein the controller is configured to increase transparency of the guide object if the ratio is equal to or greater than the reference ratio.

13. The mobile terminal according to claim 9, wherein the controller is configured to acquire the guide object based on the shape of the subject included in the preview picture and to display the acquired guide object to overlap the preview picture.

14. A method of operating a mobile terminal, the method comprising:

acquiring a preview picture including a picture of a subject;

displaying the preview picture;

displaying a guide object to provide guidance on taking the picture of the subject; and automatically taking the preview picture if a shape of the subject matches a shape of the guide object by at least one reference value, wherein a whole image acquired by taking the preview picture includes a preview image corresponding to the preview picture and an additional image corresponding to an additional picture capable of being taken by the camera, and wherein the method further comprises:

storing the whole image in a memory;

moving a position of the stored whole image so that a position of the picture of the subject corresponds to a position of the guide object; and displaying a final image according to a moving result.

* * * * *